(12) United States Patent
Hagiwara et al.

(10) Patent No.: US 6,393,561 B1
(45) Date of Patent: May 21, 2002

(54) DISK DRIVE COMPUTER WITH PROGRAMMABLE NONVOLATILE MEMORY CAPABLE OF REWRITING A CONTROL PROGRAM OF THE DISK DRIVE

(75) Inventors: Mitsuo Hagiwara, Tamamura-machi; Hiromasa Takahashi, Takasaki; Satoshi Yamato, Maebashi; Nobuo Shibasaki, Kodaira; Mitsuo Yotsutani, Takasaki; Tsutomu Ishii, Matsudo, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/171,002
(22) PCT Filed: Apr. 9, 1997
(86) PCT No.: PCT/JP97/01204
    § 371 Date: Feb. 10, 1999
    § 102(e) Date: Feb. 10, 1999
(87) PCT Pub. No.: WO97/38367
    PCT Pub. Date: Oct. 16, 1997
(51) Int. Cl.[7] ............................................. G06F 9/00
(52) U.S. Cl. .................................................. 713/100
(58) Field of Search ....................... 713/1, 100; 360/69, 360/75, 78.07

(56) References Cited

U.S. PATENT DOCUMENTS

| | | | |
|---|---|---|---|
| 4,979,055 A | 12/1990 | Squires et al. | 360/69 |
| 5,388,267 A | 2/1995 | Chan et al. | |
| 5,481,713 A | 1/1996 | Wetmore et al. | 395/705 |
| 5,737,765 A | 4/1998 | Shigeeda | 711/170 |

FOREIGN PATENT DOCUMENTS

| | | |
|---|---|---|
| EP | 524719 | 1/1993 |
| JP | H.2-81130 | 3/1990 |
| JP | 2-81130 | 3/1990 |
| JP | 6-175829 | 6/1994 |
| JP | 6-187141 | 7/1994 |
| JP | 7-64795 | 3/1995 |

OTHER PUBLICATIONS

Interface, vol. 21, No. 8, Aug. 1995, S. Watanabe et al, "Utilization of Microcomputer with built-in Flash Memory", pp. 175–185.

Nikkei Electronics, published by Nikkei Business Publications, Inc., Jun. 6, 1994, pp. 67–96.

Watanabe et al., "Learning about High–Speed/Multi–Port Communication through Fabrication", Interface 95, vol. 21–8 (219th issue), 99. 175–185, Aug. 1995, CQ Publishing Co. Ltd., (Japan) (w/English translation).

Primary Examiner—Dennis M. Butler
(74) Attorney, Agent, or Firm—Mattingly, Stanger & Malur, P.C.

(57) ABSTRACT

A microcomputer (5) which is an integrated circuit including an electrically erasable and programmable nonvolatile semiconductor memory (56) and a central processing unit (51) is used for control of a disk drive (2). The nonvolatile semiconductor memory holds an application program such as a recorded information reproducing control program in an application program area (561), and holds a reboot program used for updating the application program in a reboot program area (560). The central processing unit executes the reboot program to rewrite the application program in whole or part, in response to a rewrite command for the application program which is supplied from the outside.

23 Claims, 28 Drawing Sheets

DISK DRIVE COMPUTER WITH PROGRAMMABLE NONVOLATILE MEMORY CAPABLE OF REWRITING A CONTROL PROGRAM OF THE DISK DRIVE

TECHNICAL FIELD

The present invention relates to a recorded information reproducing apparatus which uses a medium such as CD-ROM (Compact Disk-Read Only Memory), DVD (Digital Versatile Disk, Digital Video Disk), DVD-ROM, DVD-RAM, CDI (Compact Disk-Interactive), DVI (Digital Video Interactive) or MOD (Magneto Optical Disk), an information recording/reproducing apparatus including such recorded information reproducing apparatus, and a disk drive which is a generic term for those apparatus, as well as a computer in which such disk drive is mounted, and also relates to an art which facilitates rewriting of a program for controlling a recorded information reproducing operation or the like of, for example, a CD-ROM drive mounted in a personal computer as standard equipment, and which is useful for applications to improve the reliability of rewriting.

BACKGROUND ART

Disk drives such as CD-ROM drives have rapidly spread as recorded information reproducing apparatus to be interfaced with personal computers, game machines or the like. Because such CD-ROM drives or the like are based on standards for audio CD players, their data transfer speeds and data access speeds require to be increased, as compared with the audio CD players. In addition, as opposed to the audio CD players which can use processing such as interpolation of data or holding of previous values if data error cannot be corrected, such processing is meaningless to data for personal computers and it is necessary to increase the data error correcting capabilities of the CD-ROM drives.

To increase data access speed, such a CD-ROM drive or the like has adopted the art of reading and reproducing recorded information while rotating a CD-ROM disk at a speed, for example, twice or four times as fast as its normal speed, as by raising the frequency band of a preamplifier for amplifying information read from the disk, reinforcing a pickup servo circuit, or increasing the operational speed of a digital signal processing circuit. Furthermore, the art of adding a quadruple error-correcting code to a double error-correcting code has been implemented to improve the error correcting capability of such a CD-ROM drive.

However, today, the fact is that the speed of reproduction of recorded information is being changed to a far faster speed within a short period, as represented by CD-ROM drives. In the past, the reproducing speed was changed from standard speed (the linear velocity of an audio CD during reproduction) to double speed and then from double speed to quadruple speed, in a cycle of two or more years, but today, the reproducing speed is being rapidly changed from sextuple speed to octuple speed or more in a cycle of several months.

In such a situation, each time the reproducing speed is increased, the manner of circuit control, circuit constants or the like must be changed in a short period so as to change the frequency band or the gain of the preamplifier, to reinforce the pickup servo circuit, to increase the operational speed of the digital signal processing circuit, to optimize error-correcting processing, and so on.

If microcomputers are to be used for recorded information reproduction control in CD-ROM drives or the like, their recorded information reproduction control programs (including constant tables) must be changed. If such a program is to be provided in the form of a mask ROM, a mask pattern cannot be changed without a delay in the above-described extremely short cycle of change in the reproducing speed, i.e., an extremely short product cycle.

Japanese Patent Laid-Open No. 6-187141 discloses an arrangement in which a processing program for reproducing recorded information from a disk or recording information on a disk in a magneto optical disk drive is stored in a rewritable ROM to facilitate the bug-fixation or upgrading of the processing program.

Specifically, the magneto optical disk drive includes a SCSI (Small Computer System Interface) controller connected to a host and a driver connected to this controller, and firmware (processing program) for the controller is stored in a rewritable ROM and firmware for the driver is stored in an EEPROM (Electrically Erasable and Programmable ROM). If the firmware for the controller is to be rewritten, the host transfers the firmware for the controller to a buffer memory in the controller, and also transfers a write program stored in the ROM in the controller to a RAM in the controller, and then issues a command to the controller. When receiving the command, the controller writes the contents of the ROM with the firmware for the controller stored in the buffer memory, in accordance with the rewrite program held in the RAM. At the same time as this rewriting, the write program stored in the ROM is also updated. If the firmware for the driver is to be rewritten, the host transfers a rewrite program for the driver to the RAM of the controller via the buffer memory, and also transfers the firmware for the driver to the buffer memory of the controller. Then, a CPU of the controller is made to execute the rewrite program stored in the RAM. The CPU of the controller sets the firmware for the driver and addresses in the RAM of the driver in accordance with the rewrite program, and then issues a command to the CPU of the driver. The driver has a mask ROM which supports communication and basic commands, and the CPU of the driver which has received the command executes the program of the mask ROM and rewrites the contents of the EEPROM with the firmware for the driver stored in the RAM.

However, in the above-described arrangement which updates the rewrite program stored in the ROM, together with the firmware for the controller during the rewriting-of the firmware for the controller, if an abnormality occurs and the rewrite program in the RAM is broken during the rewriting of the ROM, it is expected that it takes time to recover the controller to the normal state.

In the arrangement in which a rewrite control program for the EEPROM and an interface program for rewriting are stored in the mask ROM separate from the EEPROM which holds the firmware for the driver, the mask ROM is needed in addition to the EEPROM, so that the physical scale of a system is increased. In addition, although the mask ROM is externally attached to a microcomputer or a microprocessor which is a semiconductor integrated circuit, the amount of logic required for chip select control and the like over the externally attached memory increases, and in this respect as well, it is expected that the physical scale of the disk drive increases.

In the above-described prior art, the firmware for the driver and the firmware for the controller are separately stored in the rewritable ROM and the EEPROM. The firmware for the driver is a control program which corresponds to the characteristics of a servo control circuit and the like included in the driver. The firmware for the controller is a control program for realizing interface specifications which correspond to the host. The reason why the processing programs for the magneto optical disk drive are separately stored in the rewritable ROM and the EEPROM is that the control program for the controller can be executed in conformity to interface specifications convenient for a driver adjusting operation during the manufacture of the magneto optical disk drive, and after the control program for the driver is set, the control program for the controller can finally be rewritten according to interface specifications intended for the desired host. This is intended to simplify adjustment operation and product control for the magneto optical disk drive. However, the present inventor has made it apparent that in the arrangement in which the control program for the controller and that for the driver are separately stored in the ROM and the EEPROM, the sequence of rewriting of the control program is complicated and it takes time to rewrite the control program.

The rewrite program for the ROM of the controller is held in the ROM itself, and the rewrite program for the EEPROM of the driver is held in the mask ROM. As a result, if the CPU runs away during the operation of the magneto optical disk drive, the rewrite program stored in the magneto optical disk drive itself is undesirably executed, so that the contents of the ROM or the EEPROM may also be broken.

In order to facilitate the operation of changing the processing program and the like of a disk drive, the present inventor performed further investigations from the viewpoint of the disk drive itself and from the viewpoint of an interface with a host.

In the first place, the present inventor investigated a case in which a microcomputer in which an electrically erasable and programmable nonvolatile memory was built was used for control of the disk drive, and an application program for the disk drive and an input control program for controlling the fetch of a downloaded application program were stored in the nonvolatile memory and, if necessary, a rewrite control program was also stored in the same. In this case, the application program is a program which includes a processing program for disk access (access control program) and an external interface processing program for the disk drive (interface processing program).

In the above case, the present inventor made it apparent that there still were several problems to be solved.

One problem is that if the disk drive itself holds the write control program and the input control program, the write control program and the input control program must not be unrecoverably broken or lost during the writing of the application program. If the write control program or the input control program is broken or lost, it becomes difficult to subsequently rewrite the application program.

Another problem is that the rewrite control program and the input control program which are held in the nonvolatile memory of the microcomputer itself must be highly reliable.

In the second place, the present inventor investigated an art which makes it possible to easily change the application program and the like, in view of a situation in which computers such as personal computers are provided with disk drives as standard equipment.

Today, almost all hard disk interfaces for computers such as personal computers (hereinafter also referred to simply as PCs) conform to IDE (Integrated Device Electronics), and PC (Personal Computer) boards have a plurality of (for example, four) IDE interface ports. A description of IDE is given in NIKKEI ELECTRONICS, pages 67–96 (published by Nikkei Business Publications, Inc., Jun. 6, 1994). The term "IDE" used herein includes not only IDE but also a concept such as a so-called enhanced IDE which is also called "FAST ATA", "Enhanced IDE" or "Extended IDE" In the IDE interface specifications, the length of an interface cable is extremely limited, and the interface cable can normally be used as an interface with a peripheral mounted in the case of a PC. Today, almost all PCs have CD-ROM drives in their expansion slots or drive bays as standard equipment, but in the past, CD-ROM drives were generally externally attached as an option. For this reason, interface specifications for CD-ROM drives initially developed in conformity to SCSI or SCSI2.

However, the SCSI interface is generally regarded as an optional interface, and if a CD-ROM drive is to be connected via the SCSI interface, a SCSI interface board or a SCSI interface PC card are especially needed, so that costs increase as a whole. In general, IDE controller LSIs (Large Scale Integrated circuits) are inexpensive compared to SCSI controller LSIs.

To cope with this problem, ATAPI (ATA Packet Interface) has been adopted, and interfaces with PC boards have been realized in conformity to the IDE specifications, and commands conforming to SCSI or SCSI2 have been adopted. Owing to ATAPI, a CD-ROM drive can be mounted in a PC without the need for a dedicated special interface circuit, and furthermore, commands conforming to SCSI which was used in the age of SCSI interface as a standard command set can be used without modification. Specifically, ATAPI makes it possible to adopt a new interface such as enhanced IDE while inheriting the past software property for CD-ROM drives, and furthermore makes it possible to realize a cost reduction. Accordingly, today, almost all interface specifications which are adopted by CD-ROM drives mounted in PCs as standard equipment are the ATAPI interface specifications (extended specifications of IDE).

Many PC makers use ATAPI interfaces to mount CD-ROM drives in PCs as standard equipment, but in the present situation in which the cycle of change of CD-ROM reproducing speed is extremely short, as the period of evaluation of CD-ROM drives becomes longer, it becomes more difficult for PC makers to efficiently market PCs provided with CD-ROM drives of faster reproducing speed.

There are several causes which are expected to increase the period of evaluation of a CD-ROM drive in a PC maker.

In first place, since an ATAPI CD-ROM drive is mounted in a PC as standard equipment, the case of the PC needs to be decomposed when the CD-ROM drive is to be removed.

In the second place, because of the extremely short cycle of change of reproducing speed, the period required for a drive maker to develop a processing program for a CD-ROM drive becomes short, and it is expected that bug fixation is frequently performed.

In the third place, because of the extremely short cycle of change of reproducing speed, a drive maker cannot immediately improve the performance of the application program, and needs to send only hardware to a PC maker in advance and later send the application program to the PC maker on stepwise fashion, thereby finishing a CD-ROM drive. For example, in the case of a 24×CD-ROM drive, the following stepwise process is performed: the drive maker sends to the PC maker an application program for a 20× reproducing speed which can run on the same hardware, then sends an application program for a faster 24× access speed to the PC maker, and finally sends a high-performance application program in which logically insufficient points are improved or tuned. Otherwise, in the case of the 24×CD-ROM drive, the drive maker sends an application program for a minimum 1× reproducing speed and a maximum 24× reproducing speed to the PC maker, and then stepwise finishes an application program for an intermediate speed and provides it to the PC maker.

In the fourth place, if a CD-ROM drive which adopts the ATAPI interface is to be mounted in a PC as standard equipment, the CD-ROM drive is prepared as a device dedicated to a particular PC, so that the contents of the application program of the CD-ROM drive tend to be increasingly individualized for each PC type or PC maker. For example, many drive makers deliver standard-speed CD-ROM drives to PC makers as product samples, but if the respective PC makers have different drive specifications, the drive makers need to prepare additional drive specifications. One example of specifications which differ among PC makers is a reproducing control method for a disk which suffers from eccentricity, surface unevenness or the like. For a disk which suffers from eccentricity or surface unevenness, a CD-ROM drive normally automatically decreases its reproducing speed to a level at which the CD-ROM drive can read the disk. However, when to increase the reproducing speed from the decreased-level differs among the specifications of PC makers, and there is a case in which the reproducing speed is restored when the next read command is received, or a case in which the reproducing speed is not increased with respect to such a disk. Further, there is a case in which the reproducing speed is restored by using a vendor unique command. Otherwise, there is an art which provides reproduction control on a disk by combining linear velocity constant control and angular velocity constant control, and the linear velocity constant control and the angular velocity constant control are switched therebetween in various manners.

In addition, after a PC which has an ATAPI CD-ROM drive as standard equipment has been provided to an end user, a situation in which the CD-ROM disk cannot reproduce all disks may occur as the result of an improvement in reproducing speed or the spread of CD-R (Compact disc-Recordable). In this case as well, it is desirable that the end user can efficiently update the application program.

As is apparent from the above description, in the situation in which the cycle of change of reproducing speed in a CD-ROM drive is extremely short and a CD-ROM drive is mounted in a personal computer as standard equipment, a CD-ROM drive maker must prepare application programs which have different specifications for individual PC makers, in a short period. Each PC maker can evaluate a CD-ROM drive in a short period, and absolutely needs to efficiently evaluate the CD-ROM drive on a PC while receiving a bug-fix of the application program from the CD-ROM drive maker throughout an evaluation period. Accordingly, there are extremely great demands for efficient modification of application programs of CD-ROM drives.

An object of the present invention is to make it possible to efficiently modify the whole or part of an application program which includes processing programs for disk access control and interface control of a disk drive.

Another object of the present invention is to provide a disk drive which is capable of easily rewriting the whole or part of the application program without increasing the physical scale of the disk drive.

Yet another object of the present invention is to provide a disk drive which is capable of improving the reliability of rewriting of the application program.

Yet another object of the present invention is to provide a disk drive which makes it possible to perform prior mass production of hardware such as recorded information reproducing apparatus or disk drives and subsequently modify the whole or part of the application program within a period immediately before delivery, thereby enabling a reduction in the period of development of the disk drive.

Yet another object of the present invention is to provide a disk drive which can be expanded into various kinds of products based on the same hardware.

Yet another object of the present invention is to provide a computer such as a personal computer which makes it possible to modify the whole or part of the application program of a recorded information reproducing apparatus or a disk drive even if the disk drive is incorporated in the computer (i.e., without removing the disk drive).

An additional object of the present invention is to make it possible to efficiently market a computer in which a disk drive having a fast reproducing speed is incorporated as standard equipment, even in a situation in which the cycle of change of reproducing speed is extremely short.

The above and other objects and novel features of the present invention will become apparent from the following description given herein.

DISCLOSURE OF THE INVENTION

A microcomputer which includes an electrically erasable and writable nonvolatile memory in a built-in form is adopted for control of a disk drive, and the nonvolatile memory has an application program area which holds an application program including a processing program for disk access and interface control, and a reboot program area which holds a reboot program to be used for updating the whole or part of the application program.

More specifically, a disk drive comprises access means for accessing a disk which is rotationally driven, an interface circuit connected to the access means and interfaced with an outside, and a microcomputer which controls an operation of the access means and which is connected to the interface circuit. The microcomputer includes one semiconductor substrate having an electrically erasable and programmable nonvolatile semiconductor memory and a central processing unit which accesses the nonvolatile semiconductor memory. The nonvolatile semiconductor memory has a reboot program area and an application program area in its memory area. The application program area has an area which stores an application program to be executed by the central processing unit to control the access means and the interface circuit. The reboot program area has an area which stores a reboot program which causes the central processing unit to execute processing for rewriting the application program area. The central processing unit executes the reboot program to rewrite the application program area in whole or part, in response to a rewrite command for the application program area which is supplied to the interface circuit from the outside, or executes the application program stored in the application program area to control the access means and the interface circuit, in response to a disk access command supplied to the interface circuit from the outside.

The application program is an operational program which includes an access control program such as a recorded information reproducing control program and an interface control program for control of an external interface of the disk drive. The access control program performs control such as speed control of a disk and signal processing according to the speed of reproduction of recorded information. The interface control program performs control of an external interface for disk access. The rewriting of the application program area may be directed to the whole or part of the application program (both or either one of the access control program and the interface control program). If the application program includes a plurality of program modules (for example, a plurality of subroutines), it is also possible to rewrite part of the program modules. For example, when the application program is to be rewritten (updated), only a modified one of the access control program and the interface control program may be rewritten.

In accordance with the above-described features, even after the microcomputer has been mounted in the disk drive, the application program can be written into the nonvolatile memory built in the microcomputer, or the whole or part of the application program can be rewritten. Accordingly, it is possible to promptly or timely cope with a change in the reproducing speed of the disk drive, merely by rewriting the whole or part of the application program with the required modification according to an improvement in the reproducing speed at the time of a change in the reproducing speed or the like which will occur in extremely short cycles in the future.

The area of the nonvolatile memory to be rewritten is the application program area. Since the reboot program area is not an area to be rewritten, even if an abnormality occurs during the rewriting operation of the nonvolatile memory, the operation of rewriting the application program area can be again started immediately after the reboot program is executed, whereby recovery from an abnormal state during rewriting does not take much time. Since a processing program to be rewritten in the disk drive is only the processing program stored in the nonvolatile memory, it is possible to simplify control procedures for rewriting and hence shorten the time required for rewriting. Furthermore, since the nonvolatile memory which holds the processing programs for the disk drive is built in the microcomputer which is a semiconductor integrated circuit, an increase in the physical scale of the disk drive can be minimized to obtain the above-described effects.

The reboot program can include an input control program, a rewrite control program and a transfer control program. The central processing unit which responds to the rewrite command provides control to execute the input control program and fetch into a buffer RAM or the like the application program which is, in whole or part, supplied to the interface circuit from the outside, execute the transfer control program and transfer the rewrite control program from the reboot program storing area to a built-in RAM of the microcomputer. The central processing unit executes the rewrite control program transferred to the built-in RAM and writes the application program fetched in whole or part, into the application program area. According to this control, when the application program area is to be updated, the host needs only to transfer to the disk drive the whole or part of the application program to be written into the application program area subsequently to a rewrite command for the nonvolatile memory, and does not need to transfer the write control program, whereby it is possible to further reduce the processing time required to update the application program area.

The reboot program can include an input control program and a transfer control program. The central processing unit which responds to the rewrite command executes the input control program and fetches the application program and the rewrite control program which are supplied to the interface circuit from the outside, and executes the transfer control program and transfers the fetched rewrite control program to the built-in RAM of the microcomputer. The central processing unit executes the rewrite control program transferred to the built-in RAM and writes the application program fetched in whole or part, into the application program area. Accordingly, since the nonvolatile memory does not hold the rewrite control program, even if the central processing unit runs away and undesirably executes the program stored in the nonvolatile memory, there is no risk that the nonvolatile memory device is erroneously rewritten.

The reboot program further includes an area which stores a vector table and a reset processing program. The central processing unit, in response to a reset instruction, proceeds to execution of the reset processing program by referring to the vector table, and, during the execution of the reset processing program, determines whether the central processing unit is in a forced reboot state capable of responding to the rewrite command. When in the forced reboot state, the central processing unit proceeds to execution of the reboot program after receiving an input of the rewrite command. When not in the forced reboot state, the central processing unit proceeds to a state of being able to execute the application program stored in the application program area. Even if an abnormality occurs during the rewriting of the nonvolatile memory, if reset is performed to specify the forced reboot mode, the central processing unit can easily recover from the abnormality and return to the processing of rewriting the nonvolatile memory. In this respect as well, the processing time required to update the application program area can be shortened.

The application program area can have in a memory area thereof a sum storing area which stores a sum of information held in another memory area, and the reboot program area can further have an area which stores a vector table and a reset processing program. The central processing unit, in response to a reset instruction, proceeds to execution of the reset processing program by referring to the vector table, and, during the execution of the reset processing program, determines whether the central processing unit is in a forced reboot state capable of responding to the rewrite command. When in the forced reboot state, the central processing unit proceeds to execution of the reboot program after receiving an input of the rewrite command. When not in the forced reboot state, the central processing unit determines whether the sum stored in the sum storing area coincides with a sum of the information held in the aforesaid other memory area. If it is not determined that both sums coincide with each other, the central processing unit proceeds to execution of the reboot program after receiving an input of the rewrite command. If it is determined that both sums coincide with each other, the central processing unit proceeds to a state of being able to execute the application program stored in the application program area. Accordingly, if a program in the application program area is undesirably rewritten by an abnormality of the host or the disk drive, the operation of the central processing unit can be made to self-diagnostically proceed to the state of being able to rewrite the application program area, merely by being reset, even if the forced reboot mode is not specified. Accordingly, it is possible to prevent the malfunction of the disk drive.

As the nonvolatile semiconductor memory, a flash memory having a plurality of memory blocks each of which constitutes a collectively erasable unit can be adopted. The operation of erasing the application program area can be made efficient by assigning the reboot program area and the application program area to mutually different memory blocks.

It is desirable that the reliability of initial writing of a program into the reboot program area be good in terms of the nature of the program. To guarantee such reliability, it is possible to write the program into the reboot program area in the process of manufacturing the microcomputer.

To completely prevent undesirable erasure of the rewrite program, means for inhibiting rewrite of the reboot program area may be provided.

The ATAPI interface circuit can be adopted for the interface circuit. According to this arrangement, it is possible to easily use a new interface such as enhanced IDE while inheriting the past accumulated software property for disk drives which conform to the SCSI interface specifications or the like, and furthermore, it is possible to realize a cost reduction.

A computer having such disk drive comprises a main board including a microprocessor and a peripheral interface controller which are connected to a bus, and the interface circuit of the disk drive is connected to the peripheral interface controller. If a disk drive is to be mounted as standard equipment in a computer such as a personal computer which includes, for example, a PCI bus as the bus and an IDE interface controller as the interface controller, the ATAPI interface circuit can be adopted as the interface circuit of the disk drive. In almost all cases, if the disk drive is to be mounted as standard equipment in the computer, a main board and the disk drive are incorporated in one case.

During the rewriting of the application program area of the disk drive, the main board of the computer serves as a host, and the application program of the disk drive can be rewritten in whole or part via the host. Accordingly, it is possible to change the application program of the disk drive by using the microprocessor without removing the disk drive from the computer.

Accordingly, in the present situation in which the cycle of change of reproducing speed in the disk drive is extremely short and the disk drive is mounted in the computer as standard equipment so that a drive maker must prepare application programs for the disk drive, which have different specifications for individual computer makers, a computer maker can evaluate the disk drive which is incorporated in the computer, while receiving a bug-fix or an additional function relative to the application program from the drive maker throughout the period of evaluation of the disk drive. As described previously, the disk drive is provided with means such as efficient rewriting processing for the application program area and the capability to rapidly recover from an abnormality during rewriting processing and return to the rewriting processing, so that, throughout the period of evaluation of the disk drive, the computer maker can efficiently reinstall a modified application program in the nonvolatile memory built in the microcomputer. Accordingly, the computer maker can shorten the period of evaluation of disk drives.

Thus, in the present situation in which the cycle of change of reproducing speed in the disk drive is extremely short, the computer maker can efficiently market a computer which is provided with a disk drive having a faster reproducing speed.

The application program which includes the access control program such as a recorded information reproducing control program and the interface control program can be supplied from a company which manufactures or sells a disk drive to a computer maker or a company which sells a computer, or from the computer maker or the company which sells a computer to an end user of the computer, through communications means such as the Internet. Accordingly, it is possible to instantaneously send the application program to the computer maker, the company which sells the computer, or the end user of the computer. Accordingly, if the disk drive or the computer provided with the disk drive is used, the function of the drive or the computer, such as recorded information reproducing speed, can be immediately upgraded from an older version on a user side. In other words, the functions of products can be easily changed on the user side.

BEST MODE FOR CARRYING OUT THE INVENTION

<<CD-ROM DRIVE>>

Figure 1:
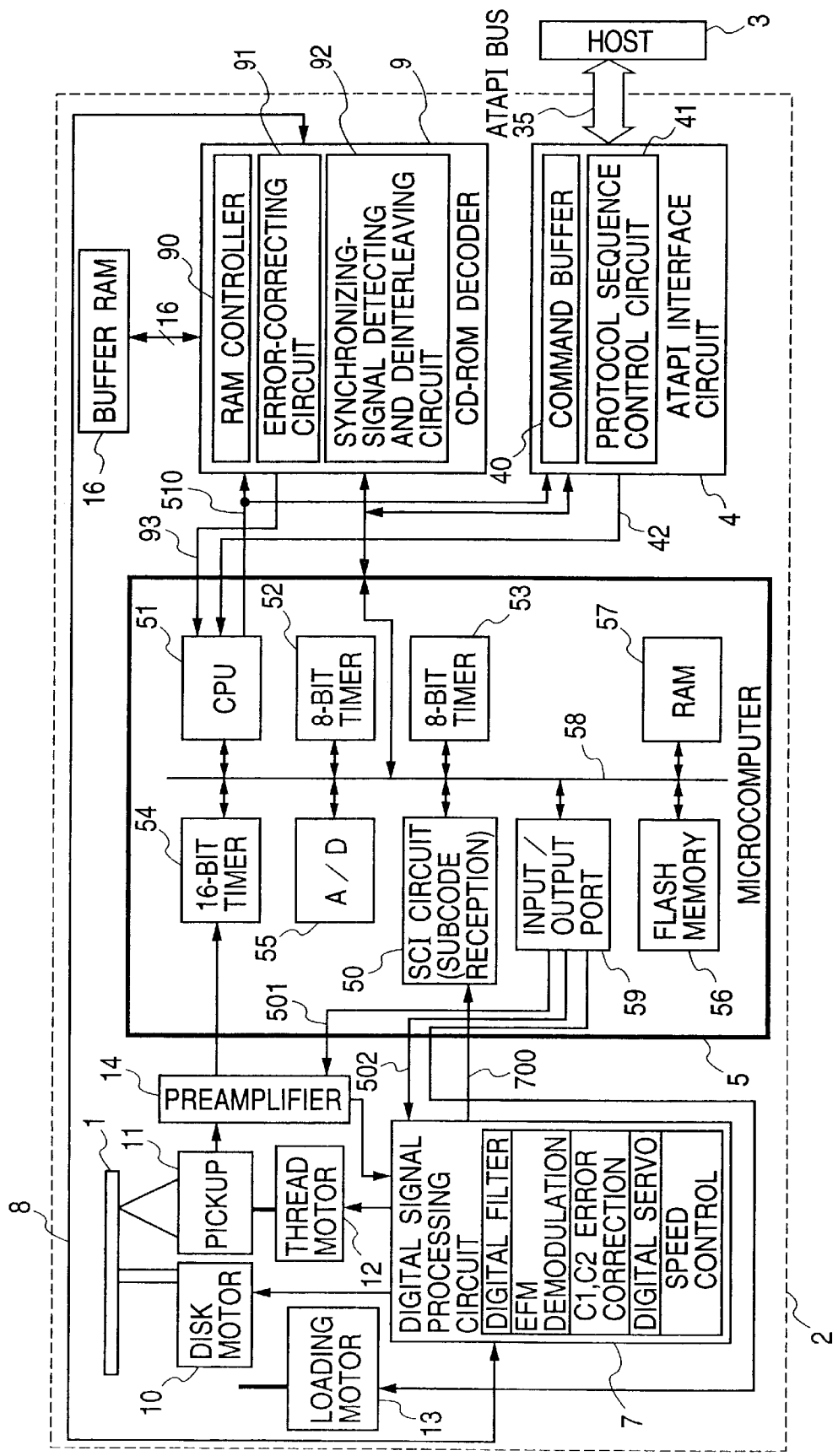
FIG. 1 is a block diagram showing a CD-ROM drive according to one embodiment of the present invention.

FIG. 1 shows a CD-ROM drive according to one embodiment of the present invention together with a host. In FIG. 1, reference numeral 1 denotes a CD-ROM disk (hereinafter referred to simply as the disk) on which, to increase the recording density thereof, information is recorded on the CD-ROM disk 1 by a CLV (Constant Linear Velocity) method in which the recording velocity of signals is constant at any position between the inner circumference and the outer circumference of the disk 1. In this disk 1, each frame includes, but not particularly limited to, one symbol (one symbol=one byte) of subcode information, twenty-four symbols of data and eight symbols of parity, and a synchronizing signal is added to each frame. Information on such frame is modulated by EFM (Eight to Fourteen Modulation), but the kind of modulation is not particularly limited to EFM. EFM is the process of converting 1-symbol 8-bit data into 14 bits. Furthermore, to remove direct-current components after the conversion, three margin bits are added to perform NRZI modulation. In addition, the frames are interleaved.

If the CD-ROM drive 2 shown in FIG. 1 is accessed by or receives a data transfer request from a host 3 via an ATAPI interface circuit 4, a microcomputer 5 executes control for responding to the request. The operation of the CD-ROM drive 2 controlled by the microcomputer 5 will be described below in outline. Information is optically read from the CD-ROM disk 1, and the read information is subjected to decoding, error correction and the like in a digital signal processing circuit 7. The decoded and error-corrected information is supplied from the digital signal processing circuit 7 to a CD-ROM decoder 9 via a bus 8 in accordance with a predetermined format such as a CD-ROM format or a CD-I format. The CD-ROM decoder 9 applies processing such as synchronizing-signal detection, deinterleaving and additional ECC error correction to the supplied information, and outputs data requested by the host 3 to the host 3 via the ATAPI interface circuit 4.

Each part of the CD-ROM drive 2 will be described below in detail.

The disk 1 is rotationally driven by a disk motor 10. A pickup 11 projects a laser beam onto the disk 1, and the reflected light is received and photoelectrically converted by a light-receiving part made of a photodiode, whereby information recorded on the disk 1 is read out. A thread motor 12 moves the pickup 11 over the disk 1 in the radial direction thereof. A loading motor 13 moves a tray (not shown) on which the disk 1 is loaded.

The digital signal processing circuit 7 realizes functions such as digital filter, EFM demodulation, C1, C2 error correction, digital servo and speed control in accordance with its operational program. The function of the digital servo is to control the thread motor 12 and control the position of the pickup 11. The function of the speed control is to control the rotational speed of the disk motor 10. The C1, C2 error correction function is error correction made by using an error-correcting code called CIRC (Cross Interleaved Reed-Solomon Code) in which two Reed-Solomon Code Systems C1 and C2 are combined. The error-correcting code is made to correspond to the parity of each of the frames.

A signal (high-frequency signal) read from the pickup 11 is amplified by a preamplifier 14 and supplied to the digital signal processing circuit 7. This read signal is binary-coded into a digital signal by the digital filter realized by the digital signal processing circuit 7. This digitized read signal is sequentially processed by the speed control function and the EFM demodulation function. The speed control function is to detect the rotational speed of the disk 1 and control the disk motor 10 to rotate the disk 1 at a predetermined speed. The speed control function also includes the function of detecting a synchronizing signal from the read signal. The EFM demodulation function is to demodulate the EFM-modulated read signal on the basis of the synchronizing signal detected by the speed control function. The subcode contained in each frame of the demodulated read signal is supplied to a SCI (serial communication interface) 50 of the microcomputer 5 in the form of a signal 700. The microcomputer 5 performs subcode signal processing on the input subcodes by using its operational program. Specifically, the microcomputer 5 assembles the supplied subcodes in the units of, for example, ninety-eight frames, and recognize the information contained in the subcodes, such as time information and index information, and supplies control information for controlling the disk motor 10, the thread motor 12 and the like to the digital signal processing circuit 7.

The recorded information which has been subjected to the demodulation and the C1, C2 error correction in the digital signal processing circuit 7 is supplied to the CD-ROM decoder 9 via the bus 8. Data supplied to the CD-ROM decoder 9 conforms to, for example, a physical format which is standardized so that data is divided into sectors each having 2,336 bytes. For example, in accordance with a CD-ROM standard, each sector includes twelve bytes for a synchronizing signal, four bytes for a header, and user data. Regarding the area of the user data, there is a standard having an additional error-correcting code such as ECC which makes it possible to correct an error which cannot be completely corrected with C1, C2 error correction. The CD-ROM decoder 9 includes a RAM controller 90, an error-correcting circuit 91 and a synchronizing-signal detecting and deinterleaving circuit 92, and is connected to a buffer RAM 16. The RAM controller 90 serves as a memory controller for the buffer RAM 16. The synchronizing-signal detecting and deinterleaving circuit 92 detects the synchronizing signal from the data of each sector sequentially supplied from the bus 8 and performs deinterleaving processing. The RAM controller 90 performs error correction on data having an error which cannot be completely corrected even with C1, C2 error correction, by using an additional error-correcting code. The deinterleaved and error-corrected data is serially stored in the buffer RAM 16 by the control of the RAM controller 90. The read data held in the buffer RAM 16 is supplied to the host 3 via the ATAPI interface circuit 4 in the units of a single or plural sectors.

The ATAPI interface circuit 4 includes a command buffer 40 and a protocol sequence control circuit 41. The protocol sequence control circuit 41 performs interface control which conforms to a standard for an ATAPI interface. The ATAPI interface is an interface specification which makes it possible to control a CD-ROM drive via an existing IDE interface controller which is used for interfacing a hard disk drive and the like with a microprocessor which constitutes the main part of a personal computer. In this ATAPI interface, commands which conform to the SCSI2 specifications are supplied to the CD-ROM drive 2 as a packet, whereby the CD-ROM drive 2 is controlled. The details of the specifications of the ATAPI interface are described in "ATA Packet Interface for CD-ROM Revision 1.2" which has been worked out by companies which belong to SSF (Small Form Factor) Committee which is an ad hoc group related to external storage devices in United States. The command buffer 40 holds the commands sent from the host 3.

<<Microcomputer>>

The microcomputer 5 includes a central processing unit (CPU) 51, 8-bit timers 52 and 53, a 16-bit timer 54, an A/D converter 55, a SCI circuit 50, a flash memory 56, a RAM 57 and an input/output port 59 all of which are provided on one semiconductor substrate such as a single-crystal silicon substrate. These circuit modules are formed to share an internal bus 58, but are not particularly limited to such a circuit configuration. The flash memory 56 which is an electrically erasable and programmable nonvolatile semiconductor memory serves as a memory for storing the operational program and constant data of the CPU 51. The CPU 51 control the preamplifier 14, the digital signal processing circuit 7, the CD-ROM decoder 9, the ATAPI interface circuit 4 and the like in accordance with its operational program. The RAM 57 serves as a work RAM which is used as a work area or the like for the CPU 51.

The flash memory 56 has a construction in which its memory areas can be collectively erased in the units of a predetermined number of blocks (memory blocks) and data can be rewritten in the units of blocks. Although such a flash memory is known and the detailed description thereof is omitted herein, each of its memory cell transistors is formed as an insulated gate field effect transistor of two-layer gate structure having a floating gate and a control gate. The operation of writing information to a memory cell transistor can be realized by applying high voltage to, for example, the control gate and the drain, and injecting electrons into the floating gate from the side of the drain by avalanche injection. The threshold voltage of the memory cell transistor as viewed from the control gate is made higher when the writing operation is performed than when the writing operation is not performed and the memory cell transistor is in an erased state. The operation of erasing information from the memory cell can be realized by applying high voltage to, for example, the source, and extracting electrons from the floating gate toward the source by tunnel phenomenon, whereby the threshold voltage of the memory cell transistor as viewed from the control gate is made lower. Whether the memory cell transistor is in a written state or an erased state, the threshold voltage of the memory cell transistor is kept at a positive voltage level. Specifically, as compared with a word line select level supplied to the control gate from a word line, the threshold voltage of the memory cell transistor in the written state is made high, whereas the threshold voltage of the memory cell transistor in the erased state is made low. Since both the threshold voltages and the word line select level have such relationship, the memory cell transistor can be formed by one transistor without the need to adopt a selecting transistor. Various kinds of control methods for the erasing operation and the writing operation of memory cell transistors have presently been realized, and some of the methods are intended to perform collective erasure in memory cell transistors whose sources are connected in common, whereas the other methods are intended to perform collective erasure in memory cell transistors whose control gates are connected in common. By such a control method, it is possible to perform collective erasure in the units of blocks. Blocks to be erased can be specified by setting control data in an erasure block specifying register. Operations relative to the flash memory 56, i.e., operations such as erasing, verification of erasing, writing, verification of writing and reading, are specified by setting control information in a mode register of the flash memory 56. Such setting is performed by the CPU 51 in accordance with the operational program.

The internal bus 58 is a generic term for buses for addresses, data and control signals. The data bus and the address bus contained in the internal bus 58 are connected to the CD-ROM decoder 9 and the ATAPI interface circuit 4. As shown in FIG. 1 for the purpose of illustration only, an access control signal 510 which is required for the CPU 51 to access the CD-ROM decoder 9 and the ATAPI interface circuit 4 is directly outputted from the central processing unit 51, and the access control signal 510 includes a read signal, a write signal, a chip enable signal and the like. Through the access control signal 510, the CPU 51 can access-the command buffer 40, or set control information in the RAM controller 90, or access the buffer RAM 16 directly or via the RAM controller 90.

The 16-bit timer 54 obtains information necessary for learning the linear velocity of the pickup 11 relative to the disk 1.

In FIG. 1, reference numeral 93 denotes an interrupt signal which is supplied to the 51 from the CD-ROM decoder 9, for example, an interrupt signal indicating the occurrence of an error which cannot be corrected even with the above-described additional error-correcting code. Reference numeral 42 denotes an interrupt signal which is supplied to the CPU 51 from the ATAPI interface circuit 4, for example, an interrupt signal indicating that a command is supplied to the command buffer 40 from the host 3. A signal 501 is control information for controlling the characteristics of the preamplifier 14, and reference numeral 502 denotes control information for controlling the functions of digital filter, C1, C2 error correction, digital servo and speed control in the digital signal processing circuit 7. The information 501 and 502 are outputted from the input/output port 59.

<<Change of Circuit Characteristics to Cope with Change of Reproducing Speed>>

In the CD-ROM drive 2, an increase in recording/reproducing speed (i.e., the speed of reading recorded information from the disk 1) involves a change of the characteristics of an internal circuit of the CD-ROM drive 2. Firstly, the rotational speeds of the disk motor 10, the thread motor 12 and the like must be increased. Secondly, the coefficients of digital servo, digital filter and the like must be changed correspondingly. Thirdly, since a period of time which can be spent for C1, C2 error correction becomes short as the result of an increase in the reading speed, a program having a modified (lowered) C1, C2 error correction capability must be adopted. For example, the correction capability to correct a maximum of six symbols of error for quadruple speed is lowered to a maximum of four symbols in the case of sextuple speed. Fourthly, since the frequency of a signal to be read increases with an increase in the reading speed, the characteristics, such as gain and frequency band, of the preamplifier 14 must be changed. To cope with the first to third points, the operating frequency of the digital signal processing circuit 7 must, of course, be increased. The first to third points can be easily coped with by changing the operational program of the CPU 51 without changing hardware. The fourth point can be coped with by using an arrangement provided with a circuit which switches over the frequency characteristics of an adder and a waveform equalizer (neither of which is shown) of the preamplifier 14 so that the frequency characteristics can optimally cope with quadruple speed, sextuple speed, octuple speed and higher speed, the frequency characteristics being able to be switched over in accordance with the operational program of the CPU 51. The switchover of the frequency characteristics is needed for improving the accuracy of binary-coding of added and waveform-equalized signals. The frequency characteristics can be optimally switched over, for example, by an arrangement which selects via a switch the values of resistance and capacitance of a waveform equalizing filter disposed in a feedback system of an adding circuit which essentially consists of an operational amplifier.

In the CD-ROM drive 2, a recorded information reproducing operation and an external interface operation are controlled by the CPU 51 which executes a recorded information reproducing control program and an interface control interface program which are contained in an application program. For example, if the recorded information reproducing speed of the CD-ROM drive 2 is to be made quadruple speed, the CPU 51 uses a recorded information reproducing control program for quadruple speed, whereas if the recorded information reproducing speed of the CD-ROM drive 2 is to be made octuple speed, the CPU 51 uses a recorded information reproducing control program for octuple speed. The term "recorded information reproducing control program" used herein is a generic term for servo control for the disk motor 10, operation control for the digital signal processing circuit 7, and operational programs for the CD-ROM decoder 9 and the like. The above term "interface control program" is a generic term for processing programs for realizing interface control of commands and data for the ATAPI interface circuit 4. Accordingly, in the CD-ROM drive 2, the term "application program" is a generic term for processing programs for reproducing information recorded on the disk 1 and supplying the reproduced information to the host 3.

<<Processing for Reproducing Speed Change Based on Rewriting of User Program Area>>

Figure 2:
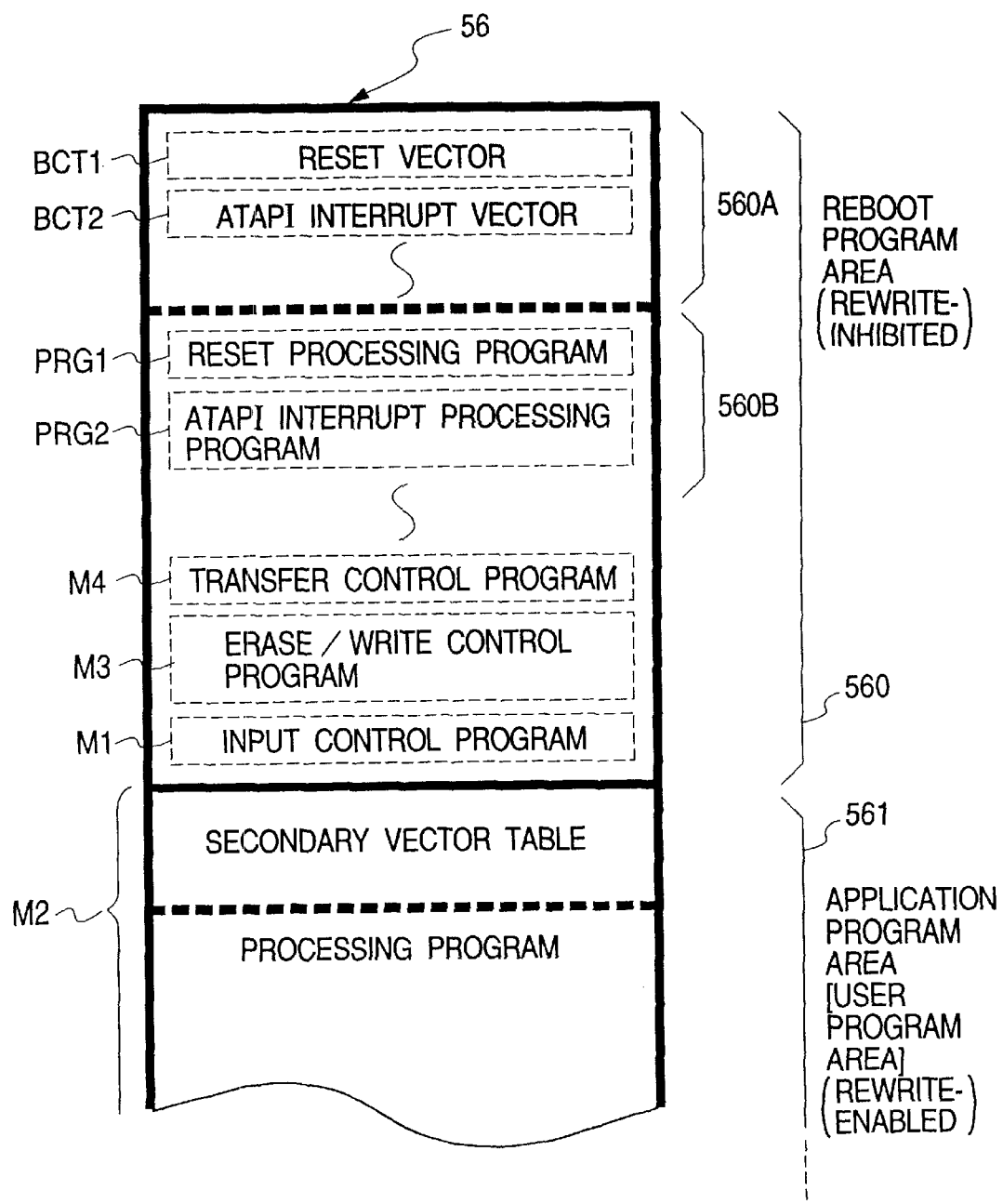
FIG. 2 is an explanatory view showing the memory areas of a flash memory.

As shown in FIG. 2 by way of example, the flash memory 56 has a reboot program area 560 and an application program area ("hereinafter referred to also as the user program area") 561 in its memory area. The application program area 561 serves as an area for storing an application program M2. The reboot program area 560 serves as an area for storing, an input control program M1, an erase/write control program M3, a transfer control program M4 and the like.

The input control program M1 serves as an interface program to be executed by the CPU 51 in order to load into, for example, the buffer RAM 16, the whole or part of an application program which is supplied to the ATAPI interface circuit 4 from the outside as an object to be written or rewritten. The erase/write control program M3 serves as a rewrite control program to be executed by the CPU 51 for the purpose of writing into the user program area 561 the whole or part of the application program loaded into the buffer RAM 16. The transfer control program M4 serves as a program to be executed by the CPU 51 in order to transfer to the RAM 57 the erase/write control program M3 stored in the reboot program area 560. The CPU 51 executes the erase/write control program M3 transferred to the RAM 57 and writes into the user program area 561 the whole or part of the application program M2 stored in the buffer RAM 16.

The reboot program area 560 further includes a vector table 560A in which vector addresses are stored, and a storage area 560B which stores predetermined programs to be referred to in accordance with the vector addresses of the vector table 560A. The vector table 560A includes a reset vector BCT1, an ATAPI interrupt vector BCT2 and the like. The program storage area 560B includes a reset processing program PRG1, an ATAPI interrupt processing program PRG2 and the like.

The reset processing program PRG1 is referred to by the reset vector BCT1. Specifically, if a power-on reset instruction or a hardware or software reset instruction is given, the CPU 51 reads in the reset vector BCT1 and branches its processing to the leading address of the reset processing program PRG1 indicated by the reset vector BCT1.

Figure 3:
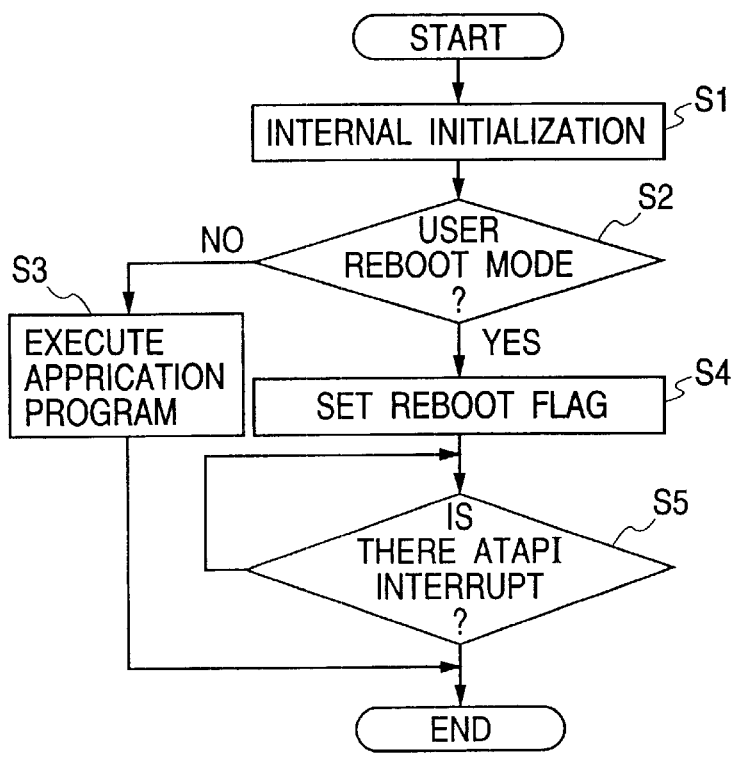
FIG. 3 is a flowchart showing one example of reset processing.

FIG. 3 shows a flowchart of reset processing. In the reset processing, first of all, internal initialization or initial setting of the internal circuit is performed (S1). Then, the microcomputer 5 determines whether to perform on-board writing or rewriting of the application program, i.e., whether a user reboot mode is specified (S2). In this embodiment, although not limited to any particular example, the condition required to activate the user reboot mode is that a predetermined switch, for example, a disk ejecting switch, is pressed when a power supply of the CD-ROM drive 2 is turned on. The user reboot mode specified by manipulating the disk ejecting switch or the like is also called a forced reboot mode. If the forced reboot mode is not specified, the process proceeds to execution of the application program M2 (S3). If the user reboot mode is specified, a reboot flag is brought to a set state (S4), and the process waits for an ATAPI interrupt (S5). The reboot flag is assigned, for example, a flag (not shown) included in the CPU 51 or a predetermined one bit of a control register.

The ATAPI interrupt processing program PRG2 is referred to by the ATAPI interrupt vector BCT2. Specifically, in an ATAPI protocol, a command is arranged at the leading end of a series of information to be supplied to the ATAPI interface circuit 4. The command is entered into the command buffer 40. If the command is entered into the command buffer 40, the ATAPI interface circuit 4 informs the CPU 51 to that effect by means of an interrupt signal 42. If the CPU 51 accepts the ATAPI interrupt, the CPU 51 refers to the ATAPI interrupt vector BCT2 and branches the process to the ATAPI interrupt processing program PRG2.

Figure 4:
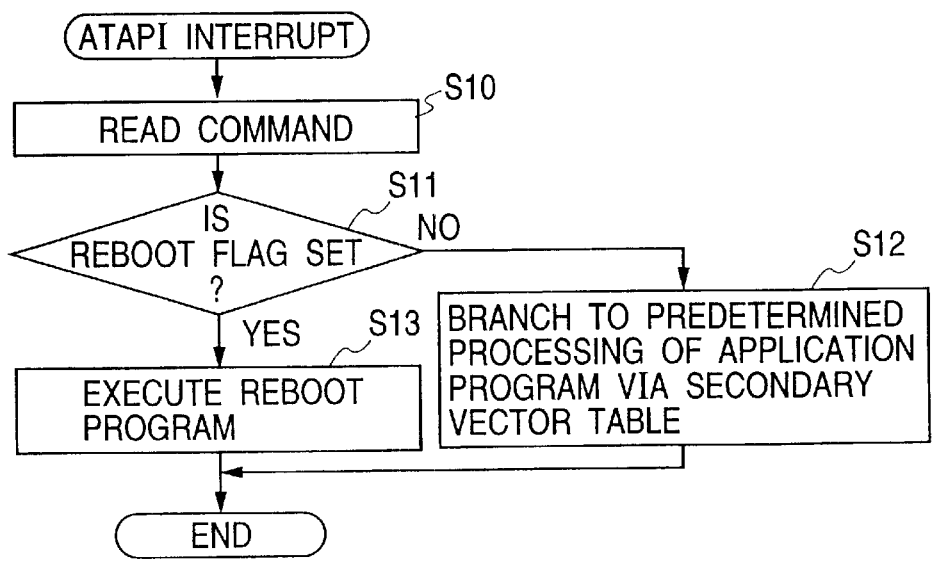
FIG. 4 is a flowchart showing one example of ATAPI interrupt processing.

FIG. 4 shows a flowchart of the ATAPI interrupt processing program PRG2. If the ATAPI interrupt occurs, the CPU 51 reads a command from the command buffer 40 and decodes it (S10). Then, the CPU 51 inspects the reboot flag. If the reboot flag is not in the set state, the CPU 51 executes a predetermined processing routine included in the application program M2, in accordance with the result of decoding of the command, and starts, for example, recorded information reproducing control for reading recorded information from the disk 1 (S12). If the reboot flag is in the set state and the command is a predetermined command (vendor unique command), a reboot program for performing on-board writing of the recorded information reproducing control program is executed.

In this embodiment, if the reboot program is executed, the CPU 51 executes the input control program M1 to store in the buffer RAM 16 the recorded information reproducing control program supplied to the ATAPI interface circuit 4 from the host 3, and also executes the transfer control program M4 to transfer the erase/write control program M3 to the work RAM 57, and then executes the erase/write control program M3 held in the work RAM 57 to write into the user program area 561 the whole or part of the application program stored in the buffer RAM 16. Although not limited to a particular kind of code information, the vendor unique command is code information which is not standardized (or used) in the ATAPI interface specifications.

Referring back to FIG. 2, the application program M2 stored in the user program area 561 includes a processing program divided into a main program and subroutines, a secondary vector table having program addresses of branch subroutines, and the like. In Step S2 of FIG. 3, if it is not determined that the user reboot mode is selected, a program counter (not shown) of the CPU 51 is forcedly set to the leading address of a processing program in the application program M2, whereby the CPU 51 executes the application program at that program address.

Figure 5:
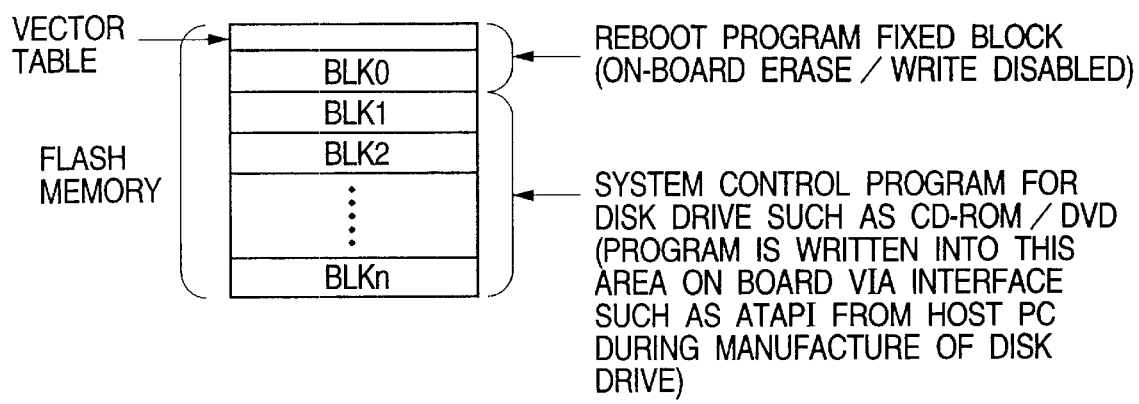
FIG. 5 is an explanatory view showing the relation between a collectively erasable unit block and a reboot program area in the flash memory.

The flash memory 56 has a plurality of memory blocks (BLK0–BLKn) each of which constitutes a collectively erasable unit, as shown in FIG. 5 by way of example. The reboot program area 560 and the user program area 561 are assigned to mutually different memory blocks. For example, the memory block BLK0 is assigned to the reboot program area 560.

The erase/write control program M3 specifies only the user program area 561 as a writable area. Specifically, as shown in FIG. 5, the control operation of the erase/write control program M3 does not specify the memory block BLK0 as an erasable and writable area to be stored in an erasure/writing specifying register. In other words, the erase/write control program M3 does not specify the reboot program area 560 as a writable area. In this sense, the rewriting of the reboot program area 560 is inhibited.

Since the program held in the reboot program area 560 cannot be rewritten via the ATAPI interface circuit 4, the reliability of initial writing of the program must be high. To guarantee such reliability, it is desirable to write the program in the process of manufacturing a microcomputer, but the writing of the program is not limited to a particular method.

Figure 6:
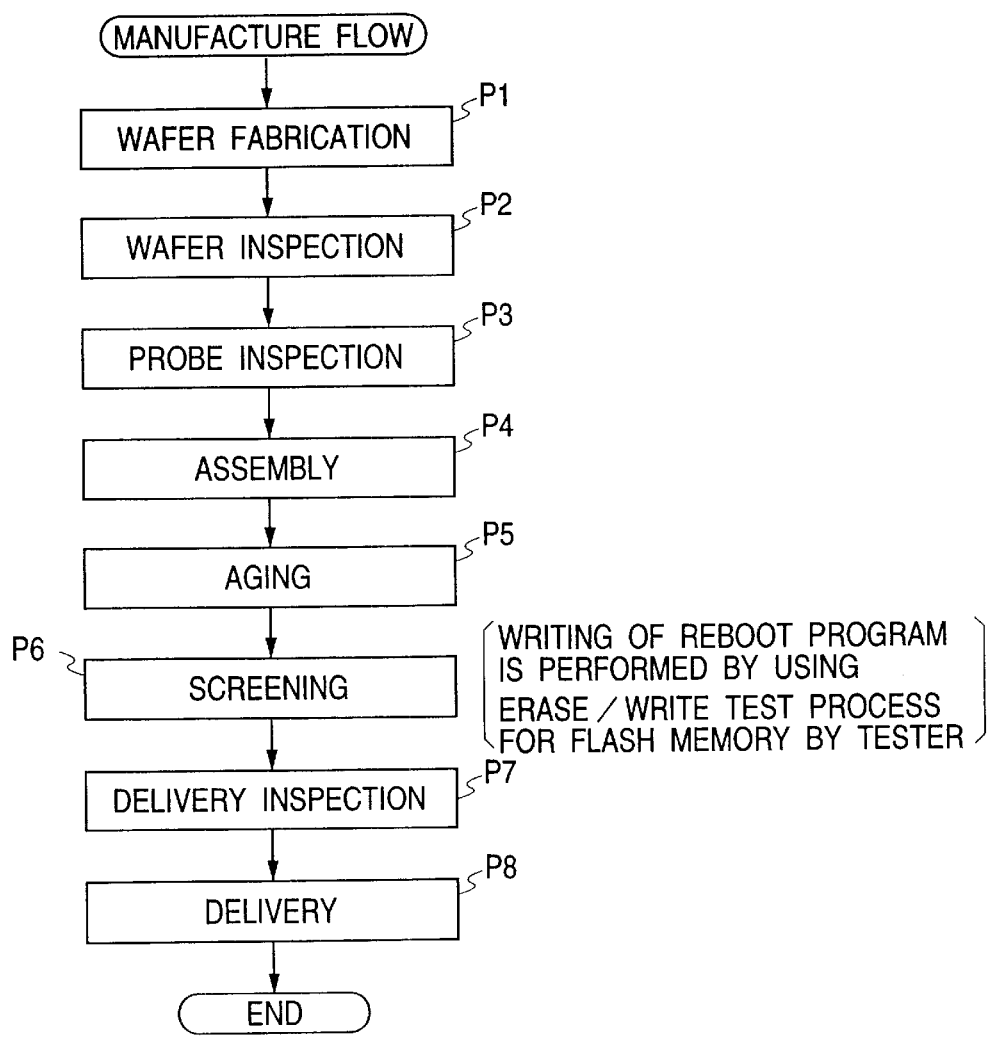
FIG. 6 is a flowchart schematically showing the process manufacturing a microcomputer having a built-in flash memory.

FIG. 6 schematically shows the process of manufacturing a microcomputer. Circuits each constituting a microcomputer are formed over a single-crystal silicon wafer by using, for example, a multiplicity of mask patterns, thereby fabricating a wafer over which such circuits are integrated (Step P1). An inspection of the fabricated wafer is carried out (Step P2), and a probe inspection of the circuit functions over the wafer is carried out to determine whether each microcomputer chip over the wafer has a defect (Step P3). After the probe inspection, a plurality of microcomputer chips are cut out from the wafer by dicing, and non-defective chips are assembled into microcomputer LSIs through steps such as bonding and packaging (Step P4). After assembled, the microcomputers are made to operate with atmosphere temperature and operating voltage being set to their maximum allowable limits, whereby aging is performed so that a failure which may occur in the near future can be made to appear in advance (Step P5). After the aging, the screening of the microcomputer LSIs is performed with a tester (Step P6). The screening step includes a erase/write test of the built-in flash memory 56. By using this step, the reboot program such as the erase/write control program is written into the reboot program area. In addition, in this step, it is easy to perform an operation test of the written reboot program. After the screening step, the microcomputer LSIs are stocked and are subjected to delivery inspection before delivery (Step P7), and products which have passed in the delivery inspection are delivered (Step P8).

In the above-described manner, the erase/write control program M3 does not use the reboot program area 560 as an erasable/writable area. This is a so-called software protect. Hardware protect means can also be provided to prevent the reboot program area 560 from being accidentally erased/ written by the runaway of the CPU or a defect of a user program.

Figure 7:
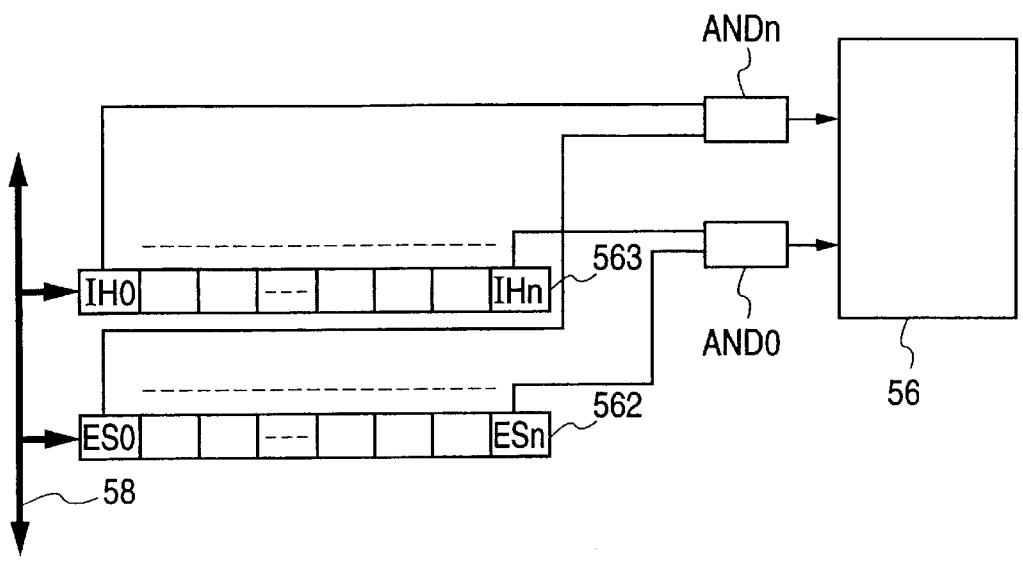
FIG. 7 is a block diagram showing one example of hardware protect for preventing undesirable erasure of the reboot program area.

FIG. 7 shows one example for realizing hardware protect. In FIG. 7, reference numeral 562 denotes an erasure block specifying register for specifying a memory block to be collectively erased. Referring back to FIG. 5 by way of example, the erasure block specifying register 562 has control bits ES0–ESn which have a one-to-one correspondence to the memory blocks BLK0–BLKn, and if any of the control bits ES0–ESn goes to a logic 1, the flash memory 56 is instructed to erase the corresponding memory block. Reference numeral 563 denotes an erasure-inhibited block specifying register for specifying a memory block to be erase-inhibited irrespective of an erase instruction given by the erasure block specifying register 562. Referring back to FIG. 5 by way of example, the erasure-inhibited block specifying register 563 has control bits IH0–IHn which have a one-to-one correspondence to the memory blocks BLK0–BLKn, and if any of the control bits IH0–IHn goes to a logic 0, the flash memory 56 is instructed to inhibit erasure of the corresponding memory block. The value of each of the bits of the erasure block specifying register 562 and the value of the corresponding one of the bits of the erasure-inhibited block specifying register 563 are supplied to each of two inputs of the corresponding one of AND gates AND0–ANDn, and the outputs of the AND gates AND0–ANDn are supplied to the flash memory 56 as erasure block specifying information. Data setting for the erasure block specifying register 562 and the erasure-inhibited block specifying register 563 is performed by the CPU 51. In particular, data setting for the erasure-inhibited block specifying register 563 can be performed with initialize-reset. For example, the control bit IH0 is set to a logic 0. According to this arrangement, even when the CPU 51 runs away during the execution of the erase/write control program M3, the reboot program area 560 is not erased so long as none of the values of the register 563 is accidentally rewritten.

Figure 8:
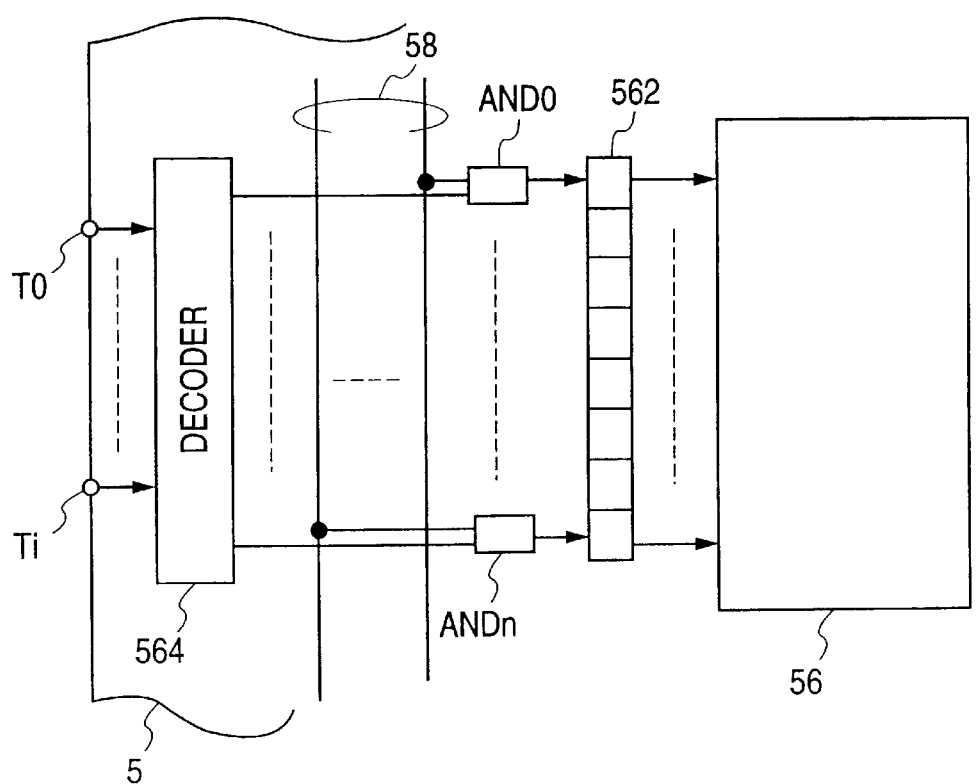
FIG. 8 is a block diagram showing another example of the hardware protect for preventing undesirable erasure of the reboot program area.

FIG. 8 shows another example for realizing hardware protect. In FIG. 8, reference numeral 562 denotes an erasure block specifying register similar to that shown in FIG. 7. A decoder 564 decodes data supplied from external terminals T0–Ti of the microcomputer 5, and outputs an erase inhibit signal which inhibits erasure in the units of a memory block. Data for the erasure block specifying register 562 is set by the CPU 51 via the internal bus 58. The AND gates AND0–ANDn each having two inputs are disposed between the internal bus 58 and the input side of the erasure block specifying register 562. Each signal line of the internal bus 58 is connected to one input of the corresponding one of the AND gates AND0–ANDn for each bit, whereas the erasure inhibit signal is supplied to the other input of each of the AND gates AND0–ANDn for each bit. Accordingly, since the output of an AND gate to which an erase inhibit signal having a logic 0 supplied is normally kept at a logic 0, the control bit of the erasure block specifying register which corresponds to the output of the AND gate never goes to a logic 1 (an erasure instruction level). For example, in a case where the memory block BLK0 is assigned to the reboot program area, if the external terminals T0–Ti are pulled up or down so that the output of the AND gate AND0 is normally kept at a logic 0, there is no risk that the reboot program area 560 is rewritten when the CPU 51 runs away.

As described above, in the CD-ROM drive 2 which is constructed in such a manner that the microcomputer 5 is mounted on a printed circuit board together with the ATAPI interface circuit 4, the CD-ROM decoder 9 and the like, when the forced reboot mode is set during reset, the CPU 51 of the microcomputer 5 executes the reboot program for the built-in flash memory 56 and updates the whole of part of the application program M2 of the user program area 561 to a new program supplied from the host 3 to the ATAPI interface circuit 4. Accordingly, it is possible to promptly or timely cope with a change in the reproducing speed of the CD-ROM drive 2, merely by rewriting the whole of part of the application program M2 with the required modification according to an improvement in the reproducing speed at the time of a change in the reproducing speed which will occurs in extremely short cycles in the future. The range of rewriting or updating of the application program is not limited to the whole of the application program, and part of the application program may only be rewritten or updated. Only the reproducing control program included in the application program may also be rewritten. In other words, if the required modification needs to be applied to the whole of the application program, the whole of the application program may be written, and if the required modification needs only to be applied to a part of the application program, only the part of the application program may be written.

At this time, the user program area 561 of the flash memory 56 is selected as an area to be rewritten. Since the reboot program area 560 is not an area to be rewritten, even if an abnormality occurs during the rewriting operation of the flash memory 56, the operation of rewriting the reboot program can be again started immediately after the reboot program is executed, whereby recovery from an abnormal state during rewriting does not take much time.

Since the application program M2 is stored in only the flash memory 56 of the CD-ROM drive 2, it is possible to simplify control procedures for rewriting and hence shorten the time required for rewriting. Furthermore, since the application program and the reboot program are stored together in the flash memory 56, an increase in the physical scale of the CD-ROM drive 2 can be minimized to obtain the above-described effects, as compared with the case in which both programs are respectively stored in separate memories.

In the above-described embodiment, the reboot program includes the input control program, the rewrite control program and the transfer control program. Accordingly, when the user program area 561 is to be updated, the host 3 needs only to transfer to the CD-ROM drive 2 the application program to be written into the user program area 561 after a write command for the flash memory 56, and does not need to transfer the rewrite control program. Accordingly, the processing time required to update the user program area 561 can be shortened further.

The reboot program area 560 has the reset vector BCT1 and the area which stores the reset processing program PRG1. The CPU 51 responds to a reset instruction and proceeds to the execution of reset processing program PRG1 by referring to the reset vector BCT1. While executing the reset processing program PRG1, the CPU 51 determines whether the forced reboot mode capable of responding to a rewrite command from the host 3 has been selected, according to whether the disk ejecting switch has been pressed. If the forced reboot mode is selected, the CPU 51 proceeds to the execution of the reboot program after receiving a rewrite command input. If the forced reboot mode is not selected, the CPU 51 brings the application program in the user program area to an executable state. Accordingly, even if an abnormality occurs during the rewriting of the flash memory 56, if reset is performed to specify the forced reboot mode, the CPU 51 can easily recover from the abnormality and return to the processing of rewriting the flash memory 56. In this respect as well, the processing time required to update the user program area can be shortened.

The flash memory 56 has the plurality of memory blocks BLK0–BLKn each of which constitutes a collectively erasable unit. Since the reboot program area and the user program area are assigned to mutually different memory blocks, the operation of erasing the user program area 561 can be made efficient. In other words, when the user program area 561 is being rewritten, it is possible to perform the operation of erasing the user program area 561 at the same time.

Since the ATAPI interface circuit 4 is used as an interface with the host 3, the CD-ROM drive 2 can use a new interface such as enhanced IDE while inheriting the past accumulated software property for disk drives which conform to the SCSI interface specifications or the like, and furthermore, it is possible to realize a cost reduction. Since the ATAPI interface specifications conform to the IDE interface which has widely spread in the field of personal computers or the like, a CD-drive maker can make use of a host system for its production line to rewrite the user program area 561. A personal computer setting maker can rewrite the reproducing control program by using a personal computer with a CD-ROM drive being incorporated in the personal computer.

<<Personal Computer>>

Figure 9:
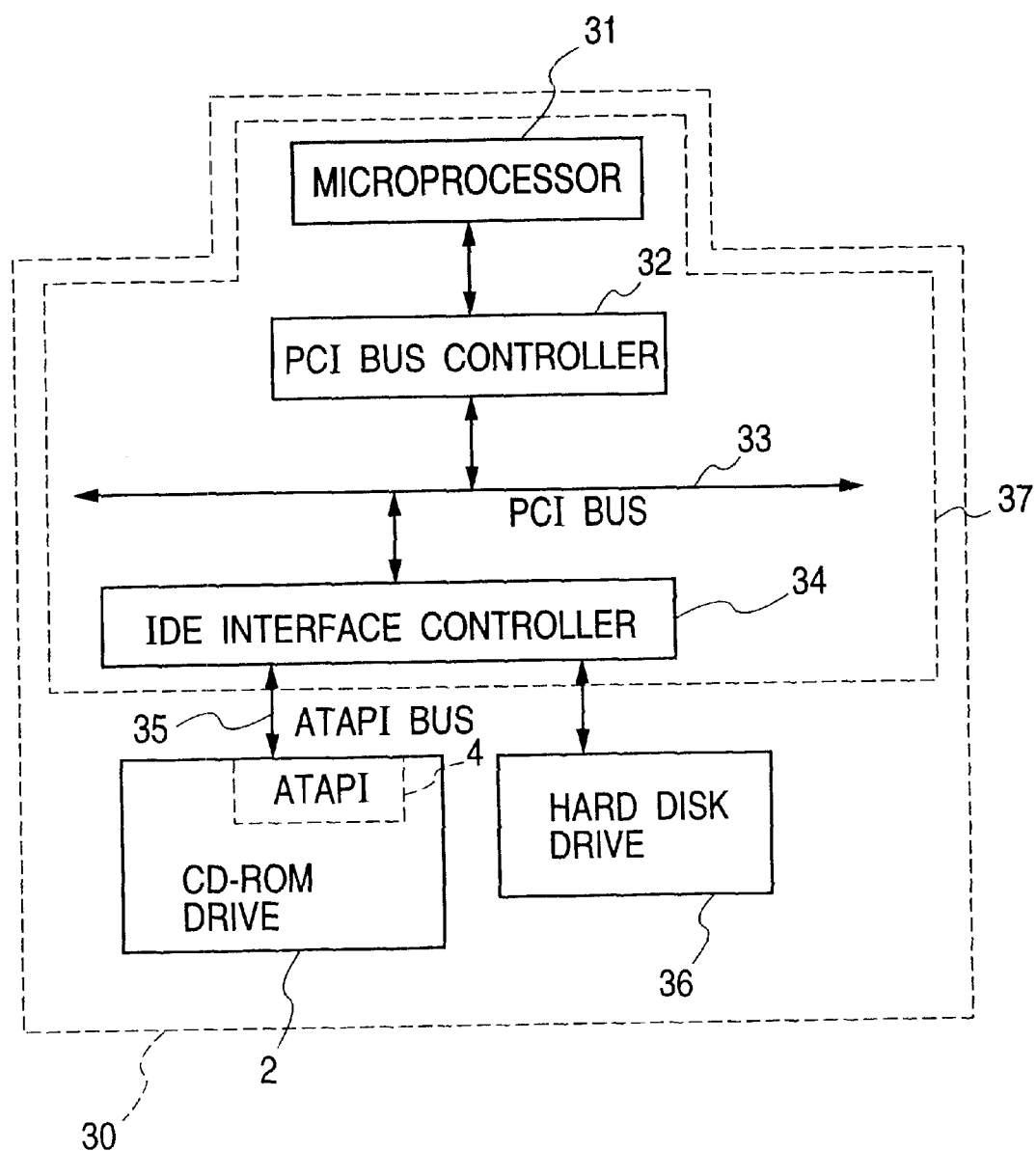
FIG. 9 is a block diagram of one example of a personal computer which has a CD-ROM drive in built-in form.

FIG. 9 shows one example of a personal computer 30 which has the CD-ROM drive 2 in built-in form. In the personal computer 30, a microprocessor 31 is connected to, but not limited to, an internal bus (PCI bus) 33 which conforms to a PCI bus standard, via a PCI (Peripheral Component Interconnect) bus controller 32. An IDE interface controller 34 which is representatively shown as a peripheral controller is connected to the internal bus 33, and the CD-ROM drive 2 is connected to the IDE interface controller 34 via an ATAPI bus 35 which serves as an interface cable. The IDE interface controller 34 performs interface control between a hard disk 36 and the internal bus 33. The microprocessor 31, the PCI bus controller 32, the internal bus 33 and the IDE interface controller 34 constitute a PC board (main board) 37. The PC board 37, the CD-ROM drive 2 and the hard disk 36 are built in a common case. Although not shown, other peripheral controllers such as a graphics accelerator, a Centronics interface controller which provides parallel interface with a printer and the like, and a floppy disk controller which provides interface control on a floppy disk drive are connected to the internal bus 33, and are mounted on the PC board. Referring to the correspondence between FIG. 9 and FIG. 1, the host 3 shown in FIG. 1 corresponds to the portion of the personal computer 30 shown in FIG. 9 which excludes the CD-ROM drive 2.

In the personal computer 30, in a manner similar to the above-described one, it is possible to easily update the reproducing control program of the CD-ROM drive 2 by causing the microprocessor 31 to execute a utility program and transfer a rewrite command or a new application program to the CD-ROM drive 2, without changing the state of connection between the CD-ROM drive 2 and the IDE interface controller 34 or without removing the CD-ROM drive 2 from the case of the personal computer 30.

<<Operation of Rewriting User Program Area>>

FIGS. 10 to 15 sequentially show the operation of rewriting the application program in the CD-ROM drive 2 which is mounted in the personal computer 30 shown in FIG. 9. In each of FIGS. 10 to 15, the CD-ROM drive 2 is shown on an enlarged scale outside a case 38 of the personal computer 30.

Figure 10:
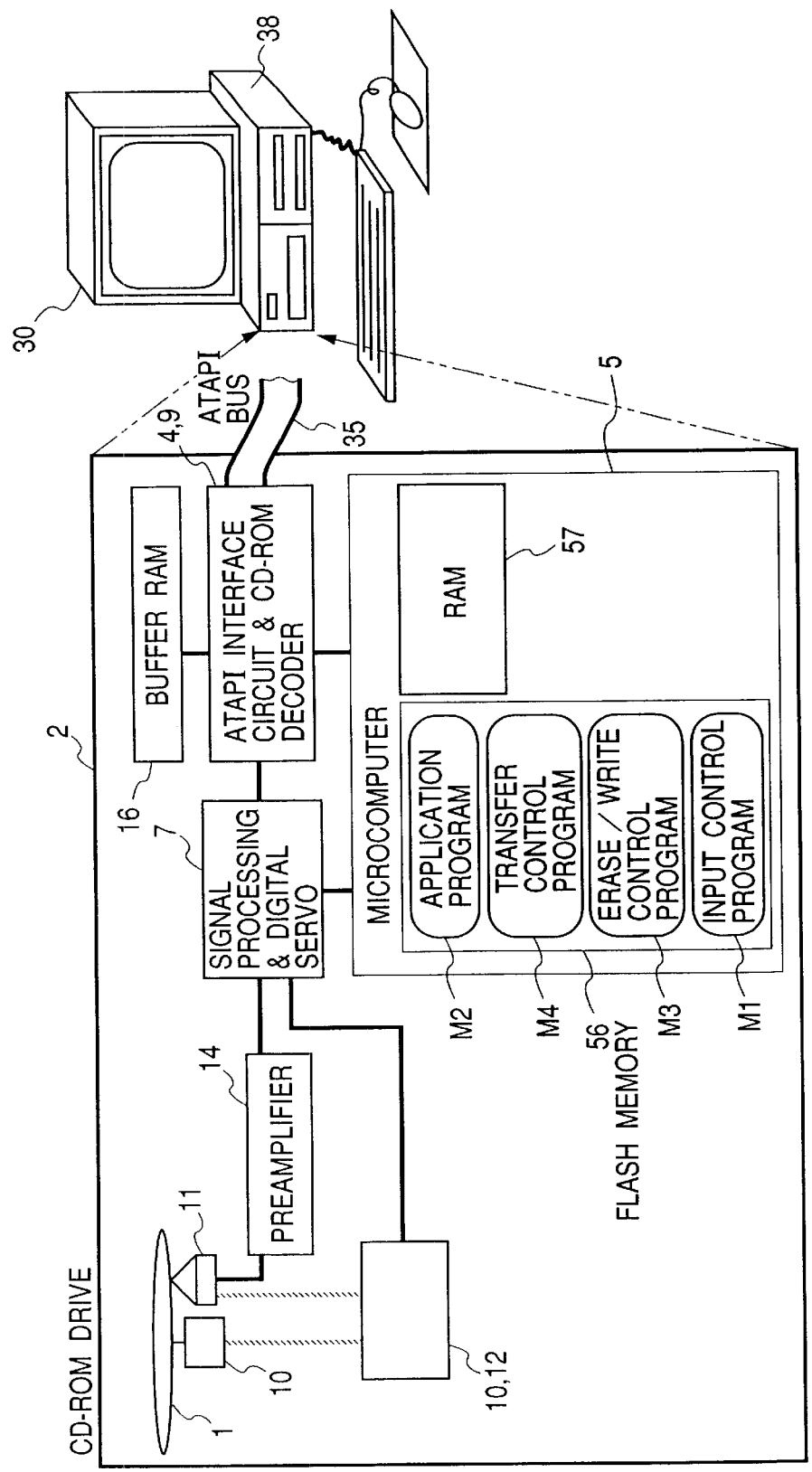
FIG. 10 is an explanatory view showing an initial state of the operation of writing an application program into the CD-ROM drive which is mounted in the personal computer.

FIG. 10 shows an initial state, and the CD-ROM drive 2 is connected to the IDE interface controller 34 via the ATAPI bus 35. The reboot program area 560 in which the input control program M1, the erase/write control program M3 and the transfer control program M4 are stored and the user program area 561 in which the application program M2 is stored are assigned to mutually different memory blocks.

Figure 11:
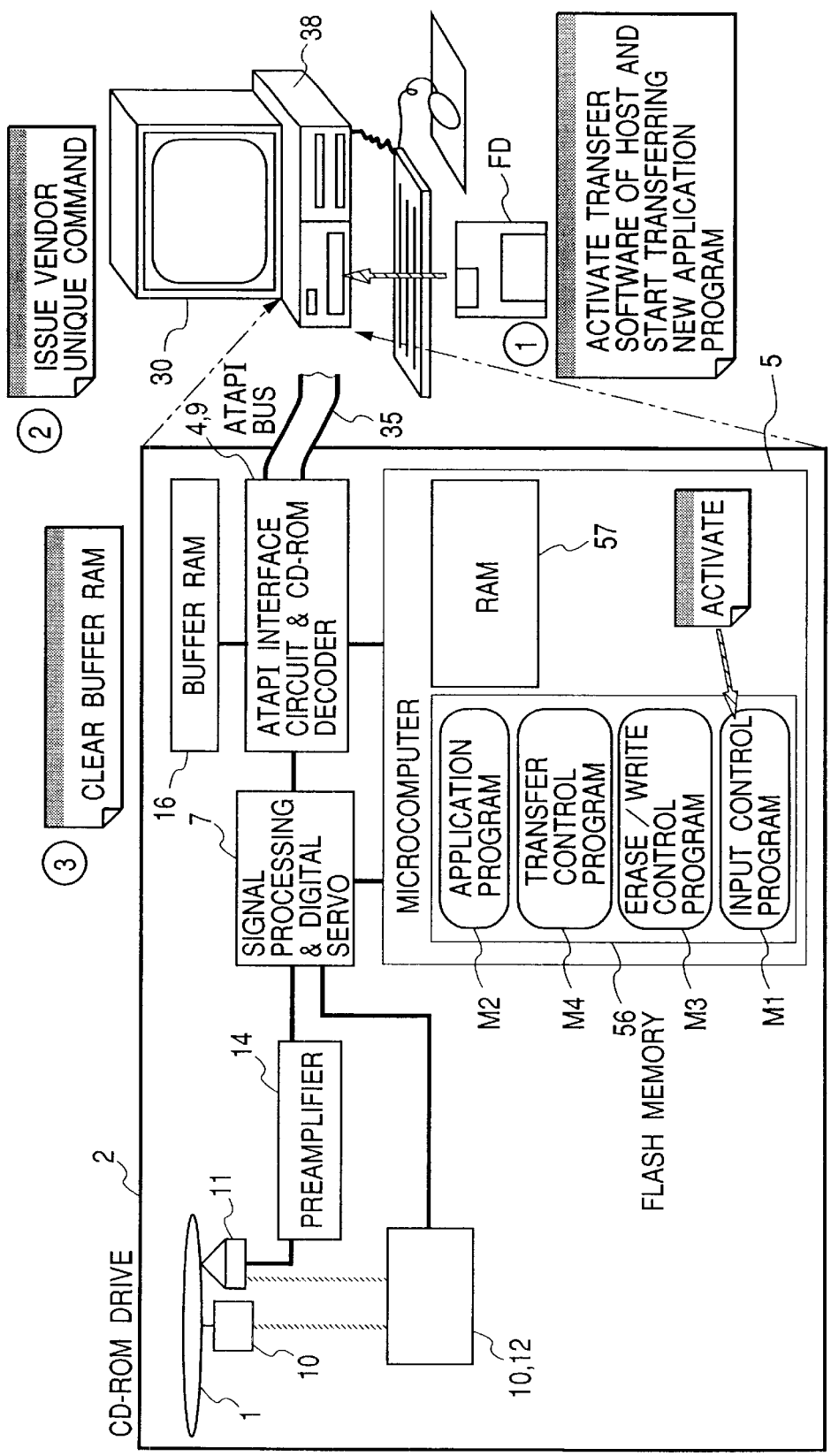
FIG. 11 is an explanatory view showing the state of starting of the operation of writing the application program into the CD-ROM drive which is mounted in the personal computer.

As shown in FIG. 11, if the application program is to be rewritten, for example, an operator resets the CD-ROM drive 2 and presses the disk ejecting switch to set the forced reboot mode in the CD-ROM drive 2. For example, a floppy disk FD stores an application program which is bug-fixed or upgraded from an older version, and a utility program for writing the application program into the CD-ROM drive 2. The utility program is transfer software for transferring the application program to the CD-ROM drive 2. The operator inserts the floppy disk FD into the floppy disk drive of the personal computer 30 to activate the utility program. The utility program may also be stored in the hard disk 36.

When a key manipulation or the like is performed on the personal computer 30 in accordance with an instruction given by the activated transfer software, the microprocessor 31 of the personal computer 30 outputs a write command for the flash memory 56 (or the aforementioned vendor unique command) via the IDE interface controller 34. The ATAPI interface circuit 4 recognizes the write command, and supplies the interrupt signal 42 to the CPU 51. Thus, the CPU 51 executes the input control program M1 and, first of all, clears the contents of the buffer RAM 16.

Figure 12:
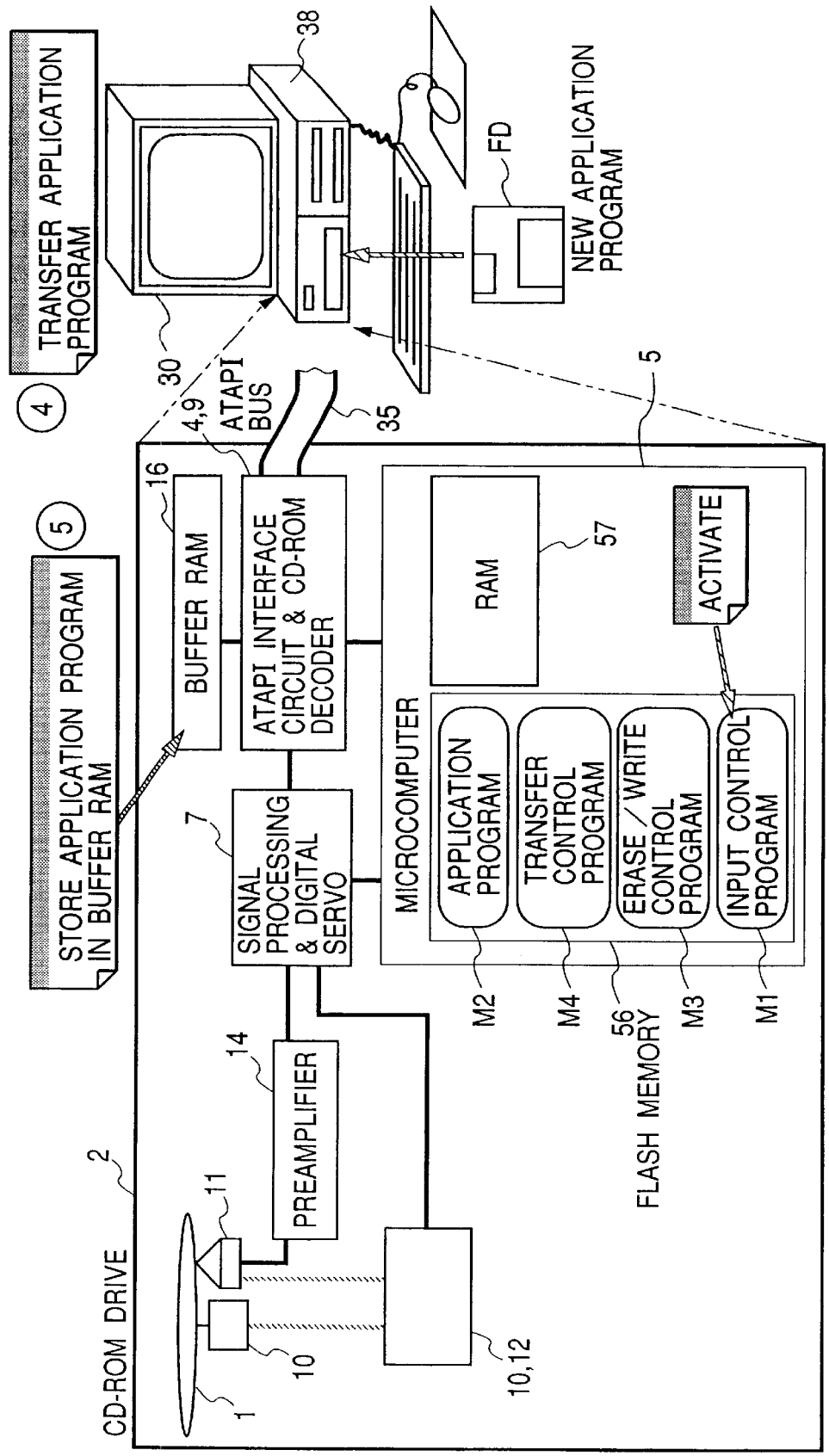
FIG. 12 is an explanatory view showing the state of transfer of the application program subsequently to the state shown FIG. 11.

As shown in FIG. 12, the microprocessor 31 of the personal computer 30 outputs a new application program via the IDE interface controller 34 subsequently to the write command. The CPU 51 executes the input control program M1. Thus, the CPU 51 sequentially stores the application program supplied to the ATAPI interface circuit 4, into the buffer RAM 16. If parity is added to information sequentially supplied to the ATAPI interface circuit 4, a parity check is made, and retransfer of a data block corresponding to a data block having an error is requested.

Figure 13:
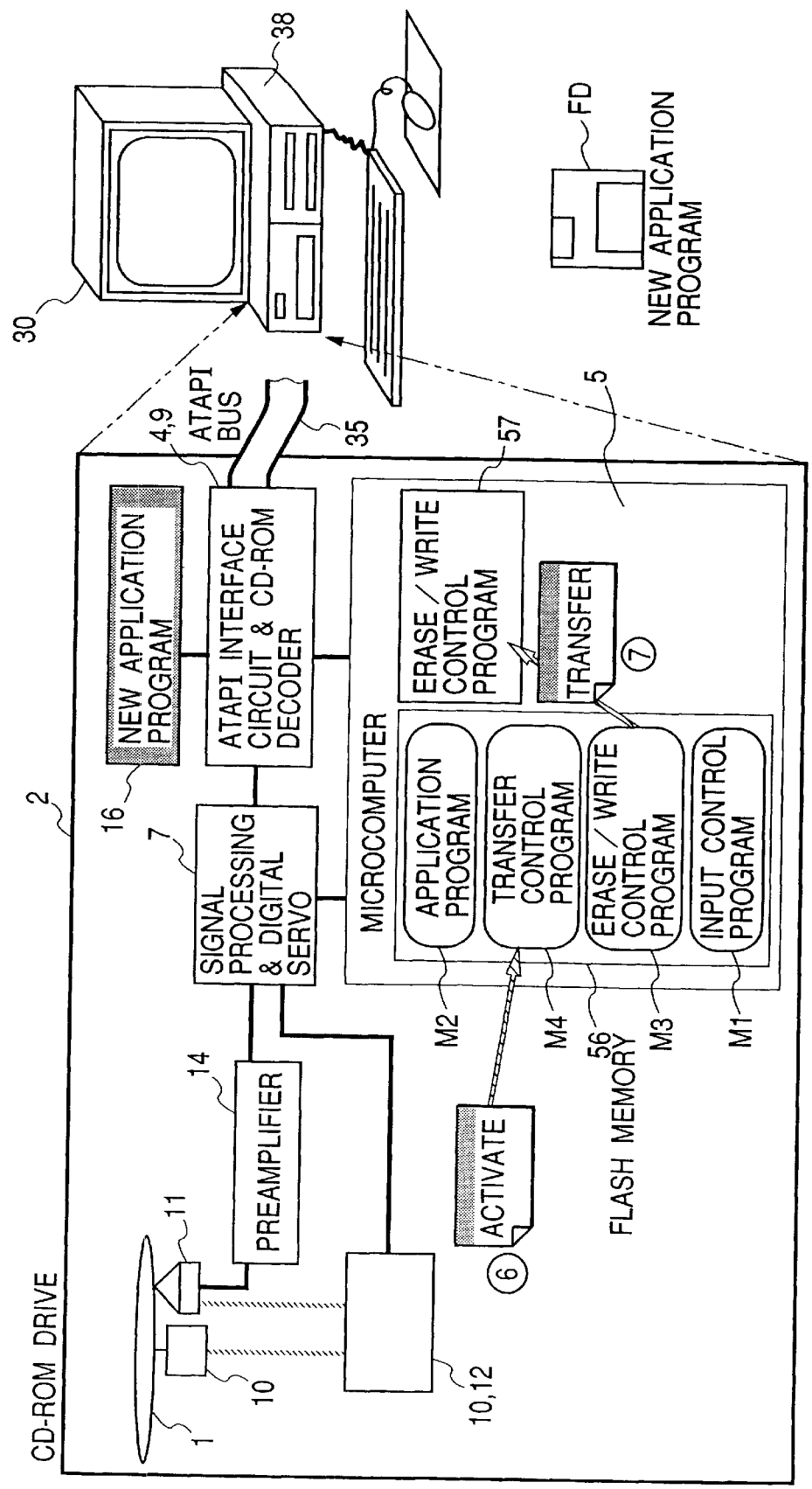
FIG. 13 is an explanatory view showing the state of activation of an erase/write control program subsequently to the state shown in FIG. 12.

As shown in FIG. 13, after the new application program has been stored in the buffer RAM 16, the CPU 51 proceeds to execution of the transfer control program M4. Thus, the CPU 51 transfers the erase/write control program M3 to the work RAM 57 of the microcomputer 5.

Figure 14:
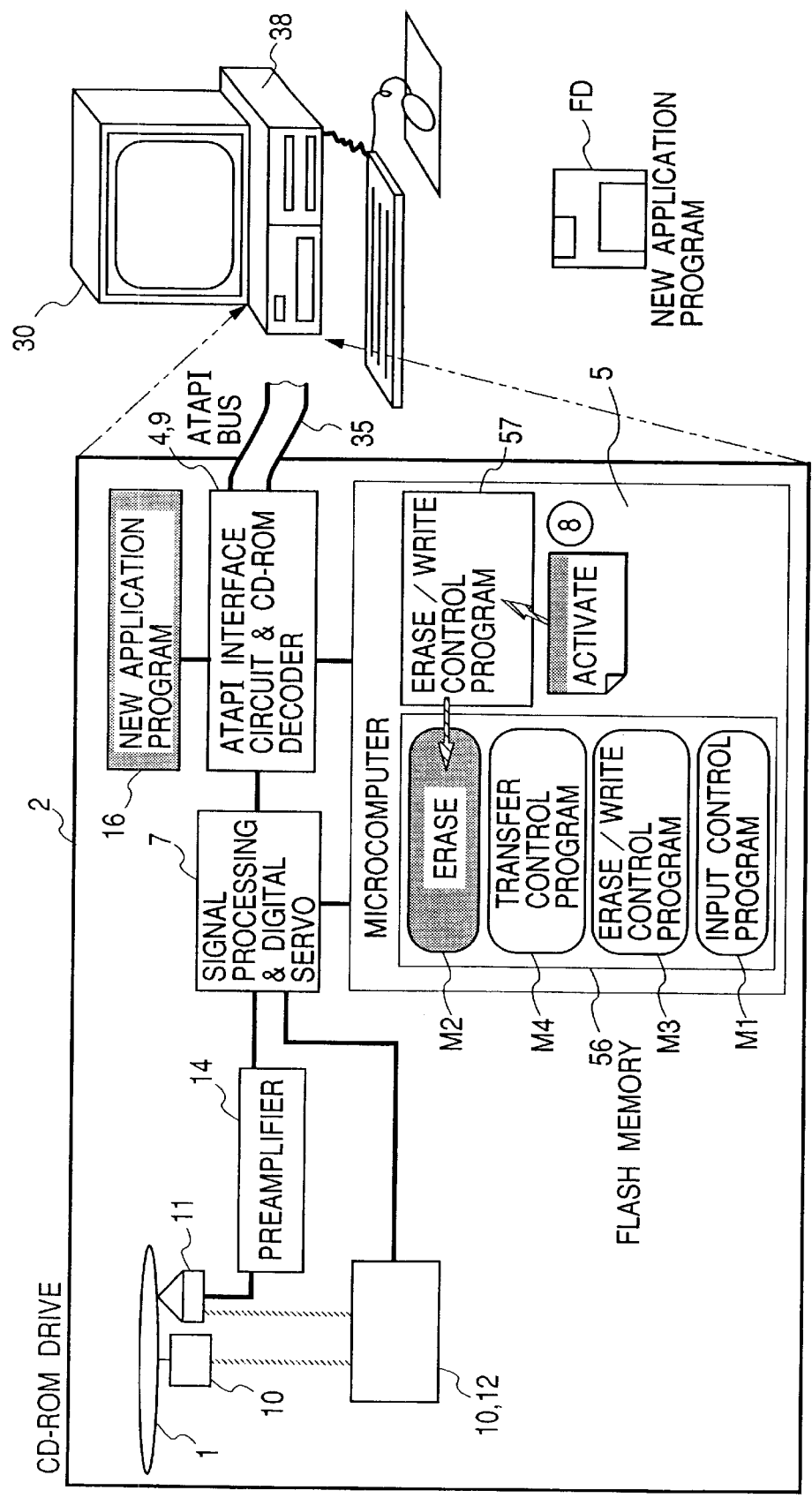
FIG. 14 is an explanatory view showing the state of erasing operation of the erase/write control program subsequently to the state shown in FIG. 13.
Figure 15:
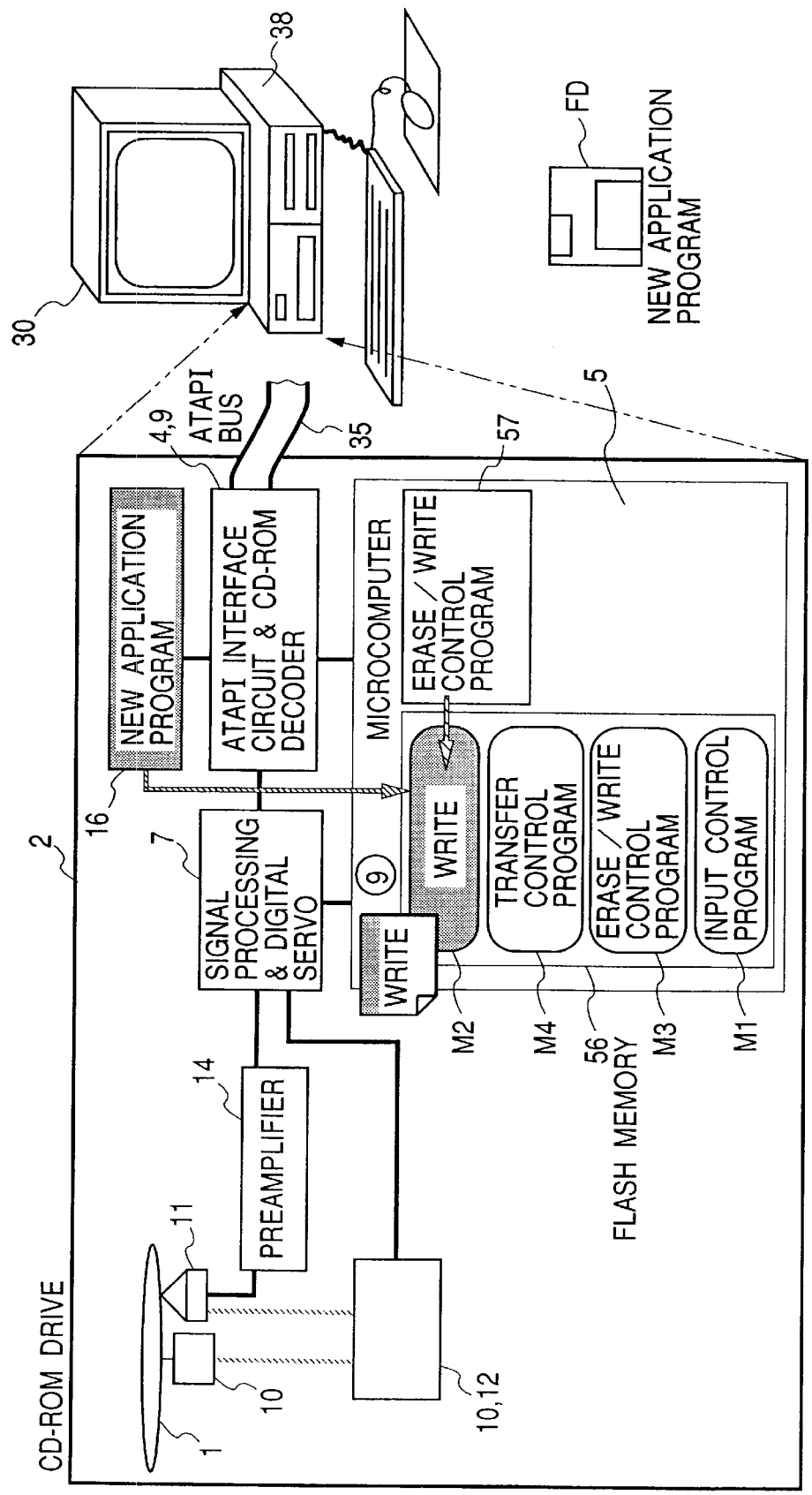
FIG. 15 is an explanatory view showing the state of writing operation of the erase/write control program subsequently to the state shown in FIG. 14.

As shown in FIG. 14, after the transfer of the erase/write control program M3 to the work RAM 57 has been completed, the CPU 51 proceeds to execution of the erase/write control program M3 stored in the work RAM 57. A block to be erased at this time is specified in accordance with the erase/write control program M3. In addition, during this time, a high voltage for writing and erasing is being supplied to the microcomputer 5. When the erase/write control program M3 is executed, first, the user program area 561 of the flash memory 56 is erased, and the result of erasure is verified. Then, as shown in FIG. 15, the CPU 51 performs both the operation of sequentially writing the new application program which is stored in the buffer RAM 16 as a new reproducing control program, into the user program area 561 of the flash memory 56, and the operation of verifying the written result. Writing addresses and the like are specified by the erase/write control program M3, but this specifying method is not a limiting example.

After the end of the writing operation, when the CD-ROM drive 2 is reset, the CD-ROM drive 2 can perform reproduction control on CD-ROM in accordance with the updated application program.

Figure 16:
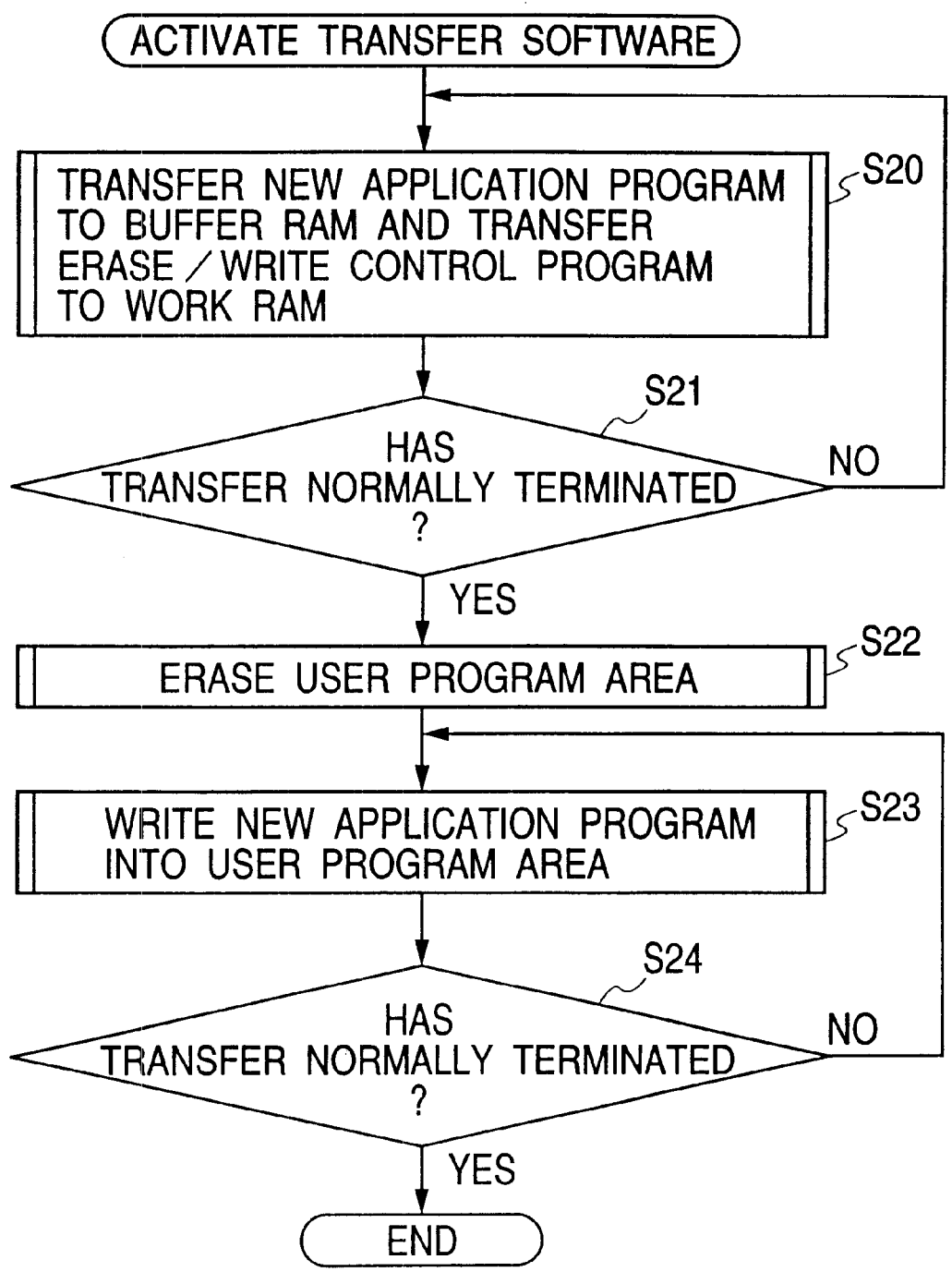
FIG. 16 is a flowchart showing the whole of the writing processing shown in FIGS. 10 to 15.

FIG. 16 schematically shows a flowchart of the operation of rewriting the user program area. When the transfer software is activated, the CPU 51 transfers to the buffer RAM 16 the new application program supplied from the microprocessor 31 via the ATAPI interface circuit 4, and transfers the erase/write control program M3 to the work RAM 57 (S20). During transfer, the CPU 51 makes a parity check or a sum check to monitor the presence or absence of an abnormal transfer (S21). If an abnormal transfer is detected, the CPU 51 retransfers the corresponding application program. When the transfer of the new application program to the buffer RAM 16 and the transfer of the erase/write control program M3 to the work RAM 57 have been completed, the user program area 561 of the flash memory 56 is erased (S22), and then, the new application program transferred to the buffer RAM 16 is written into the user program area 561 of the flash memory 56 (S23). Then, the written data is verified (S24).

Needless to say, the above-described processing of rewriting the user program area 561 can be performed with the host 3 by a CD-ROM drive maker, but the processing shown in FIGS. 10 to 16 can also be placed as a method which allows a personal-computer maker to reinstall a bug-fixed application program in the user program area 561 during a period of time in which the personal-computer maker evaluates the CD-ROM drive 2 on the personal computer 30 in which, for example, the CD-ROM drive 2 is mounted as standard equipment.

As described above with reference to FIGS. 10 to 16, during the rewriting of the user program area 561 of the CD-ROM drive 2, the PC board 37 of the personal computer 30 serves as the host, and the application program in the CD-ROM drive 2 can be rewritten via the PC board 37. Accordingly, it is possible to change the whole or part of the application program of the CD-ROM drive 2, such as the reproducing control program and the interface control program, by using the microprocessor 31 without removing the CD-ROM drive 2 from the personal computer 30.

Accordingly, in the present situation in which the cycle of change of reproducing speed in the CD-ROM drive 2 is extremely short and the CD-ROM drive 2 is mounted in the personal computer 30 as standard equipment so that a CD-ROM drive maker must prepare application programs for the CD-ROM drive 2, which have different specifications for individual personal-computer makers, a personal-computer maker can evaluate the CD-ROM drive 2 which is incorporated in the personal computer 30, while receiving a bug-fix or an additional function relative to the application program from the CD-ROM drive maker throughout the period of evaluation of the CD-ROM drive 2. As described previously, the CD-ROM drive 2 is provided with means such as efficient rewriting processing for the user program area 561 and the capability to rapidly recover from an abnormality during rewriting processing and return to the rewriting processing, so that, throughout the period of evaluation of the CD-ROM drive 2, the personal-computer maker can efficiently rewrite the contents of the flash memory 56 built in the microcomputer 5 with a modified application program. Accordingly, the personal-computer maker can shorten the period of evaluation of disk drives.

Thus, in the present situation in which the cycle of change of reproducing speed in the CD-ROM drive 2 is extremely short, the personal-computer maker can efficiently market the personal computer 30 which is provided with the CD-ROM drive 2 having a faster reproducing speed.

In addition, even if an OS (Operating System) for the personal computer is modified (upgraded from an older version), it is possible to rapidly make a correction which is required to reflect an interface function which processes commands relative to the modified OS, onto an interface control program of an application program.

The application program can be supplied from a company which manufactures or sells the CD-ROM drive 2 to a personal-computer maker or a company which sells a personal computer, or from the personal-computer maker or the company which sells a personal computer to an end user of the personal computer, through communications means such as the Internet. Accordingly, it is possible to instantaneously send the application program to the personal-computer maker, the company which sells the personal computer, or the end user of the personal computer. Accordingly, if the personal computer 30 is provided with hardware or software for gaining access to the Internet, a reproducing control program which is bug-fixed or upgraded from an older version can be easily reinstalled in the user program area 561, whereby not only is it possible to shorten the period of evaluation of the CD-ROM drive by the personal-computer maker, but also the end user can easily change the functions of the CD-ROM drive.

<<Downloading of Erase/Write Control Program>>

In the above-described construction, the erase/write control program M3 is disposed in the user program area 561 of the flash memory 56, and the erase/write control program M3 is internally transferred from the user program area 561 so that the CPU 51 executes the transferred program. However, the erase/write control program M3 may not be stored in the flash memory 56, and may be downloaded to the work RAM 57 via the host 3 or the PC board 37 each time the user program area 561 is rewritten. In this case, since the flash memory 56 does not hold the erase/write control program, even if the CPU 51 runs away and accidentally executes the program stored in the flash memory 56, there is no risk that the flash memory 56 is erroneously rewritten.

FIGS. 17 to 22 sequentially shows the operation of rewriting the application program of the CD-ROM drive 2 which is mounted in the personal computer 30, in the case where the flash memory 56 does not hold the erase/write control program M3. In each of FIGS. 17 to 22, the CD-ROM drive 2 is shown on an enlarged scale outside the case 38 of the personal computer 30.

Figure 17:
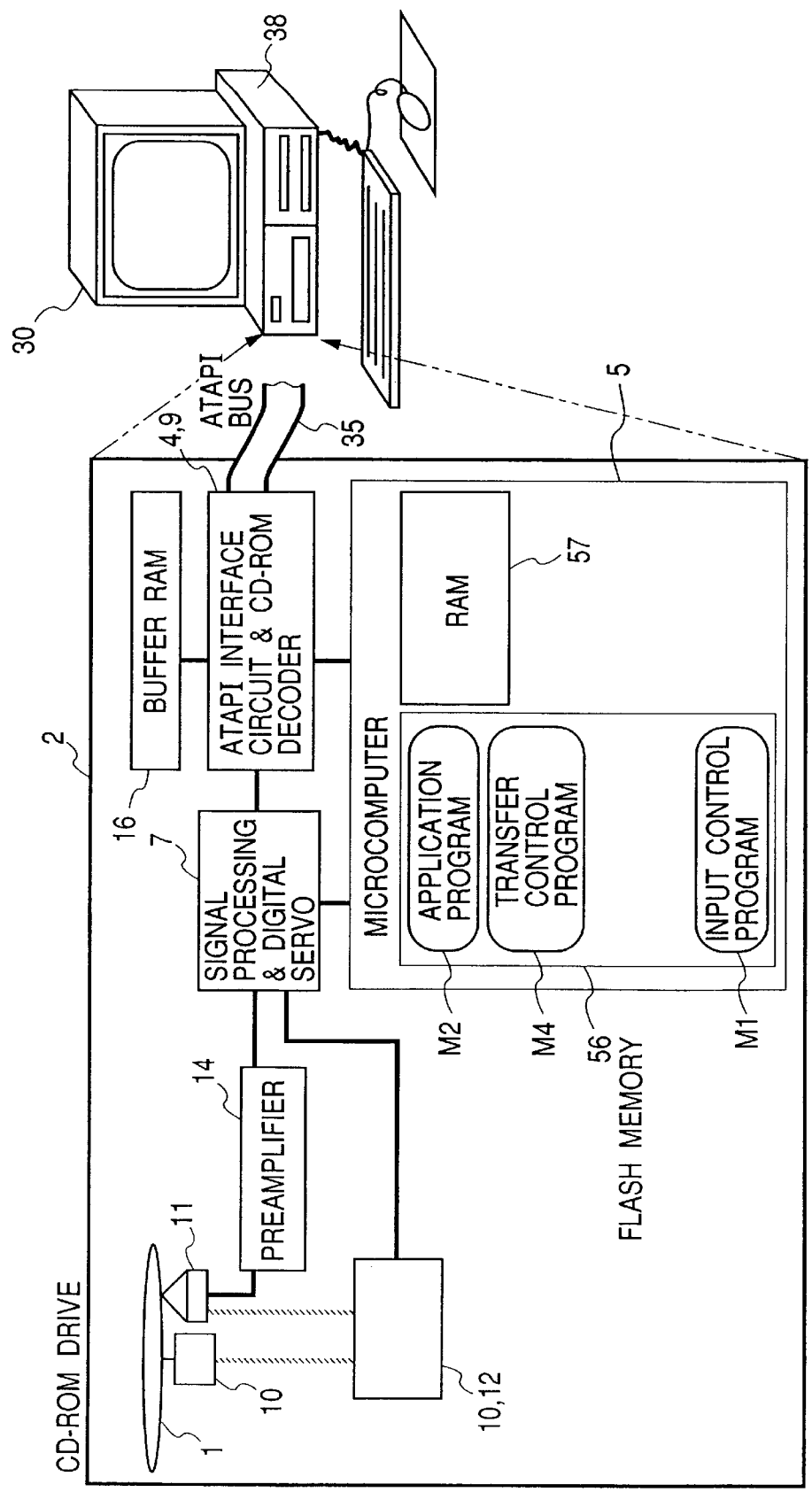
FIG. 17 is an explanatory view similar to FIG. 10, but showing an initial state of the operation of receiving the erase/write control program from the outside of the CD-ROM drive and writing the application program into the CD-ROM drive.

FIG. 17 shows an initial state, and the CD-ROM drive 2 is connected to the IDE interface controller 34 via the ATAPI bus 35. The erase/write control program M3 is not stored in the reboot program area 560.

Figure 18:
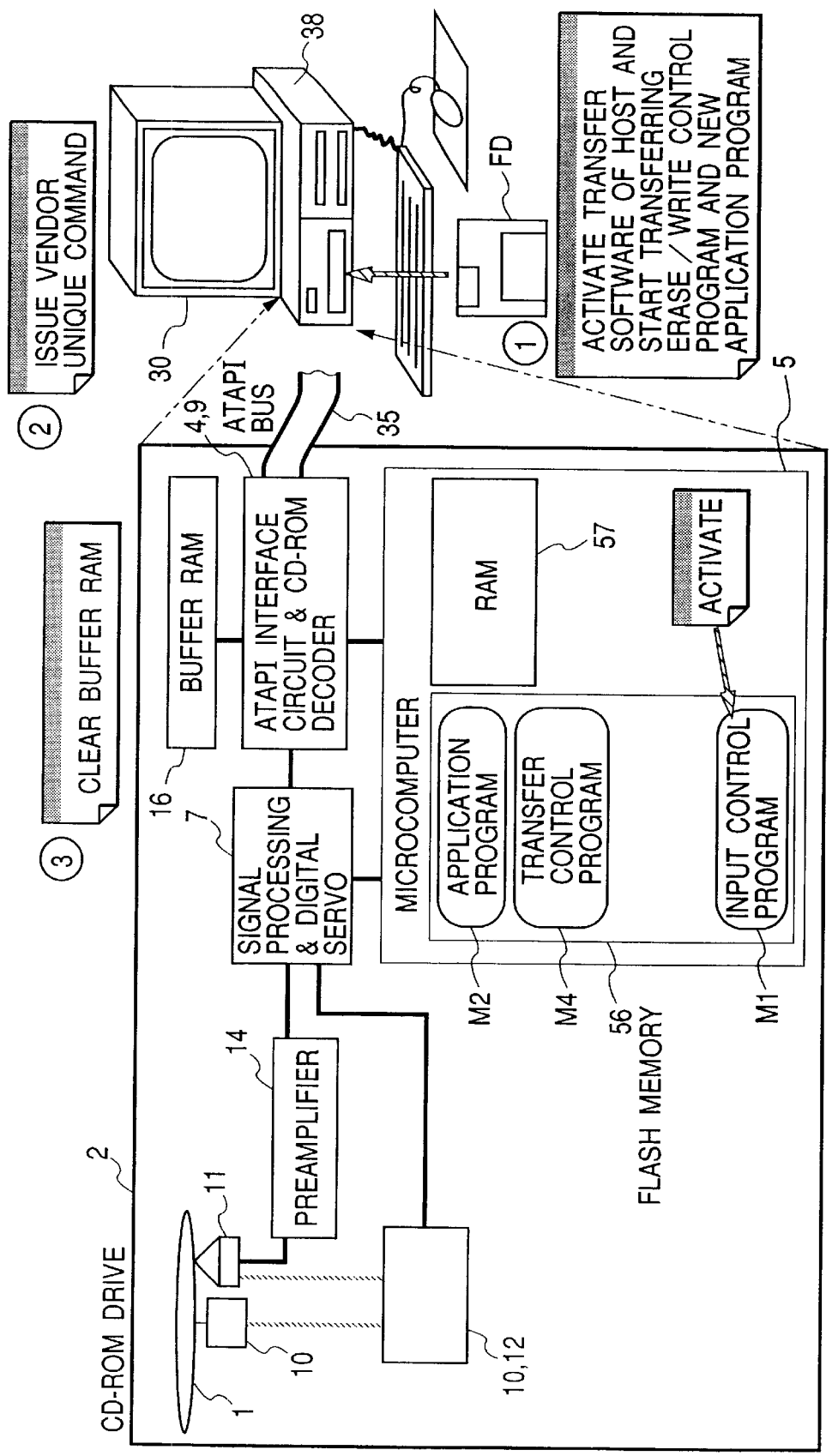
FIG. 18 is an explanatory view similar to FIG. 10, but showing the state of starting of the operation of receiving the erase/write control program from the outside of the CD-ROM drive and writing the application program into the CD-ROM drive.

As shown in FIG. 18, if the application program is to be rewritten, for example, an operator resets the CD-ROM drive 2 and presses the disk ejecting switch to set the forced reboot mode in the CD-ROM drive 2. For example, the floppy disk FD stores an application program which is bug-fixed or upgraded from an older version, an erase/write control program to be executed by the CPU 51 to write the application program into the user program area 561, and a utility program to be executed by the microprocessor 31 to cause the CPU 51 to execute the processing of rewriting the user program area 561. The utility program is transfer software for transferring the application program and the erase/write control program to the CD-ROM drive 2. The operator inserts the floppy disk FD into the floppy disk drive of the personal computer 30 to activate the transfer software. The utility program may also be stored in the hard disk 36.

When a key manipulation or the like is performed on the personal computer 30 in accordance with an instruction given by the activated transfer software, the microprocessor 31 of the personal computer 30 outputs a write command for the flash memory 56 (or the aforementioned vendor unique command) via the IDE interface controller 34. The ATAPI interface circuit 4 recognizes the write command, and supplies the interrupt signal 42 to the CPU 51. Thus, the CPU 51 executes the input control program M1 and, first of all, clears the contents of the buffer RAM 16.

Figure 19:
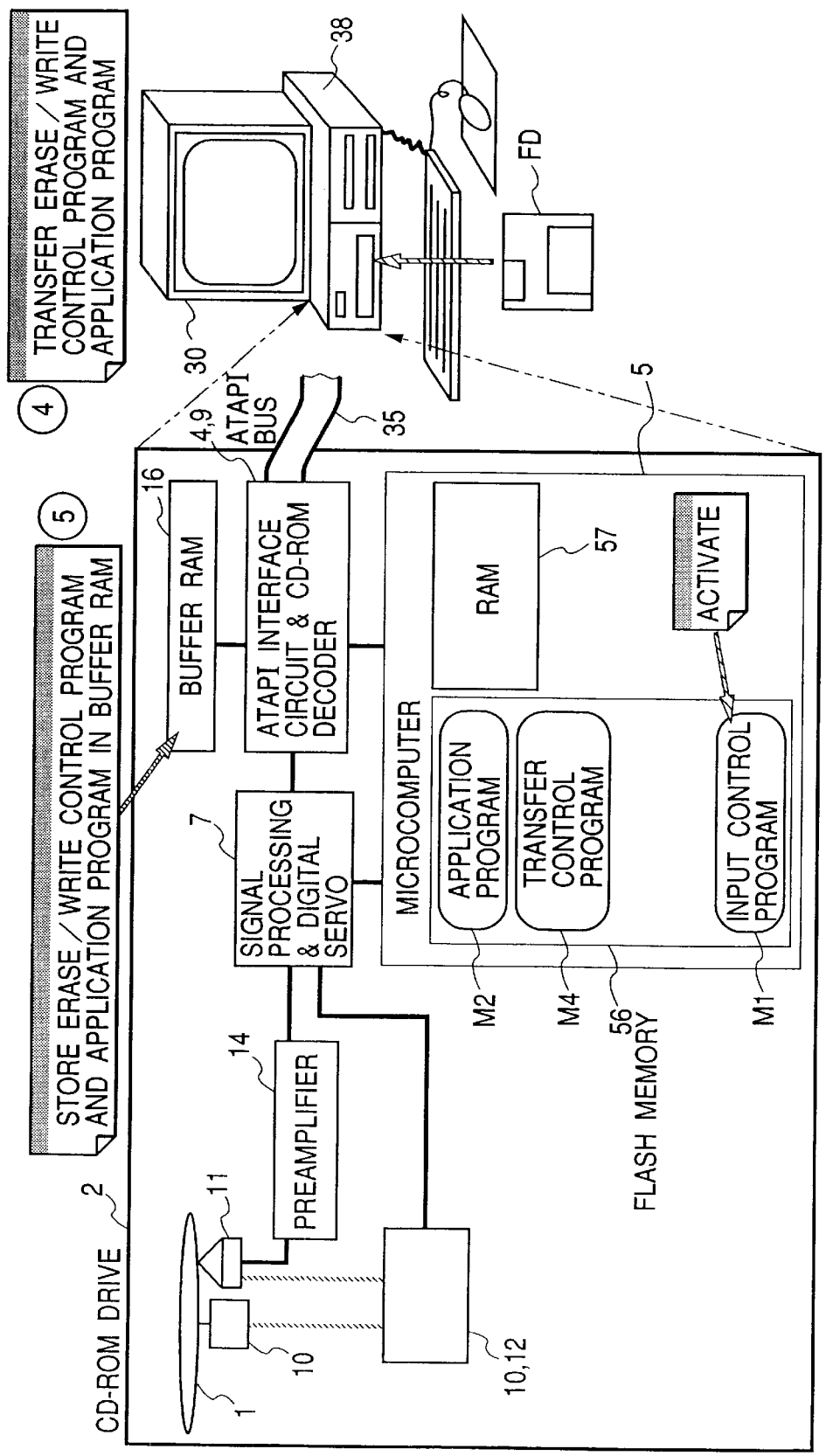
FIG. 19 is an explanatory view showing the state of transfer of the application program subsequently to the state shown FIG. 18.

As shown in FIG. 19, the microprocessor 31 of the personal computer 30 outputs a new application program and the erase/write control program via the IDE interface controller 34 subsequently to the write command. The CPU 51 executes the input control program M1. Thus, the CPU 51 sequentially stores the application program and the erase/write control program supplied to the ATAPI interface circuit 4, into the buffer RAM 16.

Figure 20:
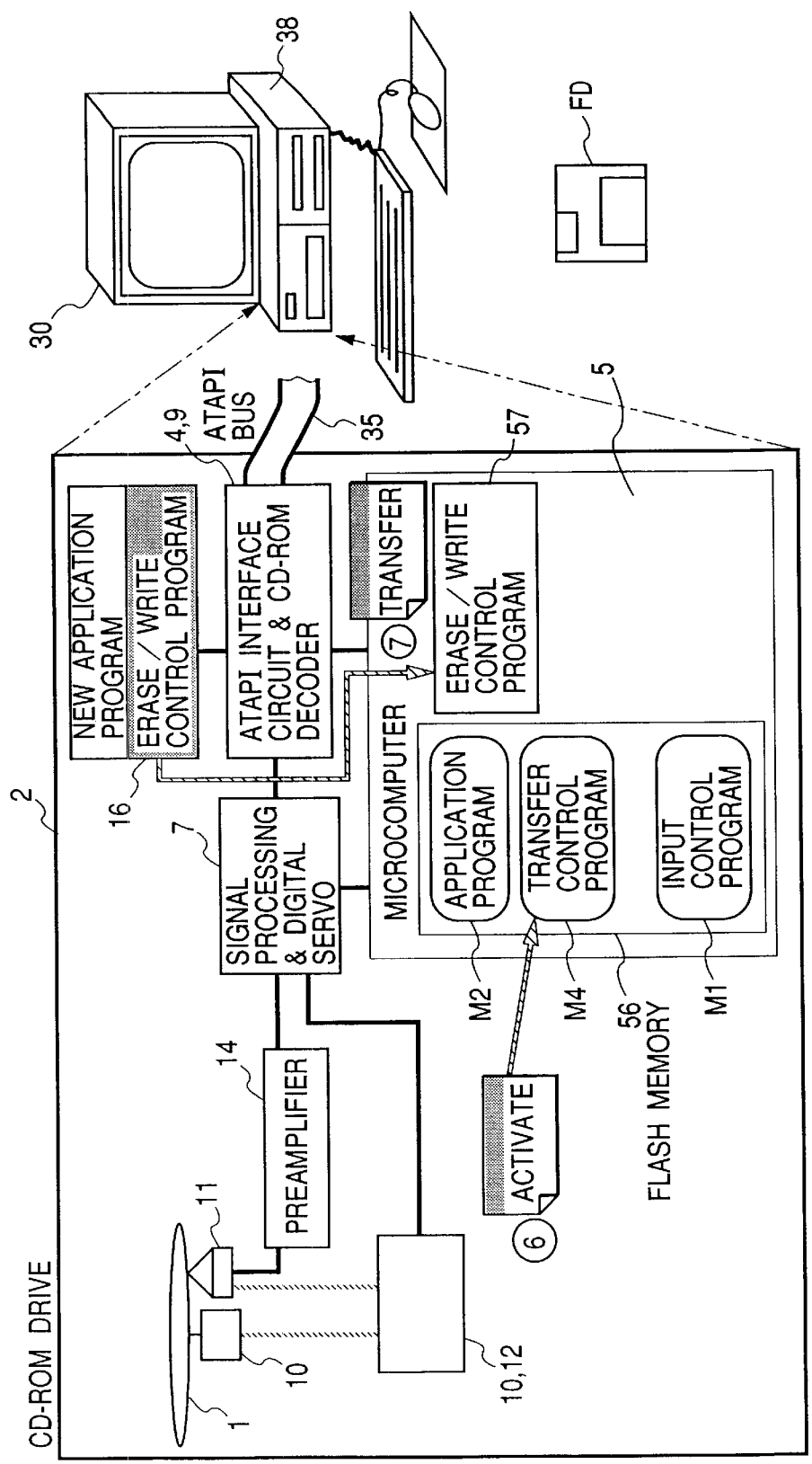
FIG. 20 is an explanatory view showing the state of activation of the erase/write control program subsequently to the state shown in FIG. 19.

As shown in FIG. 20, after the new application program and the erase/write control program have been stored in the buffer RAM 16, the CPU 51 proceeds to execution of the transfer control program M4. Thus, the CPU 51 internally transfers the erase/write control program M3 from the buffer RAM 16 to the work RAM 57 of the microcomputer 5.

Figure 21:
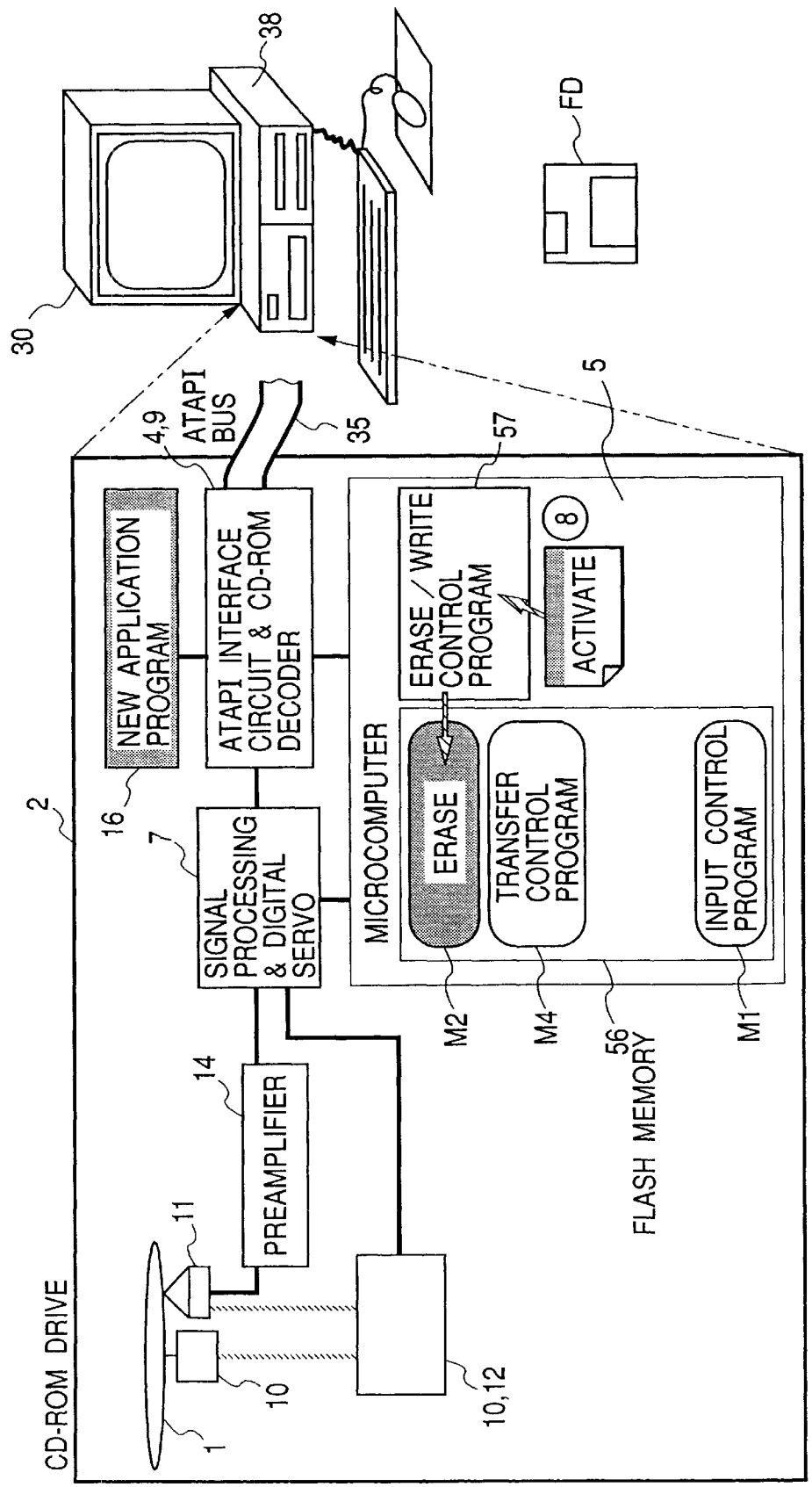
FIG. 21 is an explanatory view showing the state of erasing operation of the flash memory by the erase/write control program subsequently to the state shown in FIG. 20.
Figure 22:
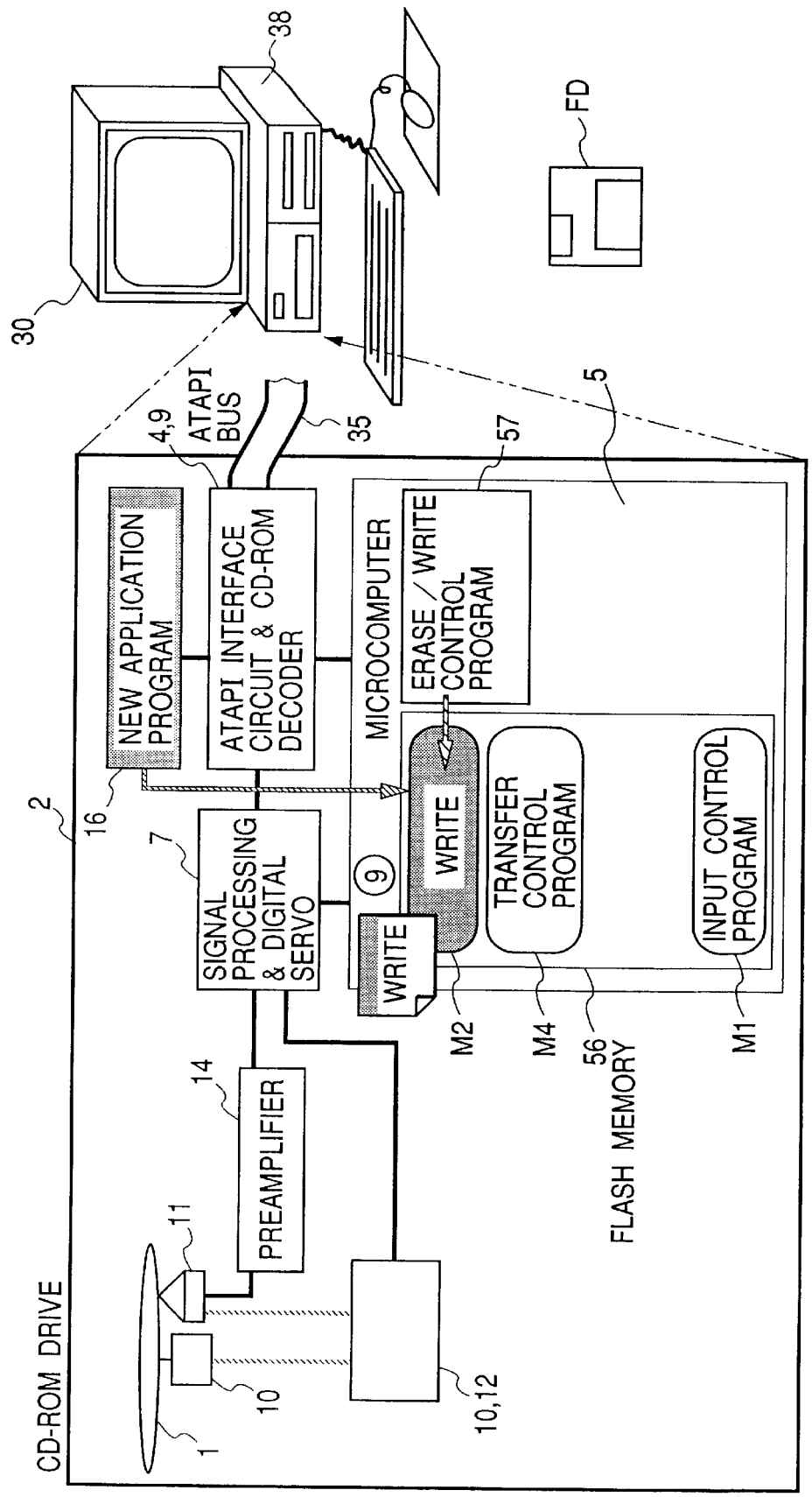
FIG. 22 is an explanatory view showing the state of writing operation of the flash memory by the erase/write control program subsequently to the state shown in FIG. 21.

Then, as shown in FIG. 21, the CPU 51 proceeds to execution of the erase/write control program M3 stored in the work RAM 57. A block to be erased at this time is specified in accordance with the erase/write control program M3. In addition, during this time, a high voltage for writing and erasing is being supplied to the microcomputer 5. When the erase/write control program M3 is executed, first, the user program area 561 of the flash memory 56 is erased, and the result of erasure is verified. Then, as shown in FIG. 22, the CPU 51 performs both the operation of sequentially writing the new application program which is stored in the buffer RAM 16, into the user program area 561 of the flash memory 56, and the operation of verifying the written result. After the end of the writing operation, when the CD-ROM drive 2 is reset, the CD-ROM drive 2 can perform reproduction control on CD-ROM in accordance with the updated application program.

<<Checksum against User Program Area>>

The setting of the above-described forced reboot mode requires the manipulation of the disk ejecting switch. In the following description, reference will be made to the CD-ROM drive 2 which makes it possible to set not only the forced reboot mode but also an operational mode capable of rewriting the user program area 561.

Figure 23:
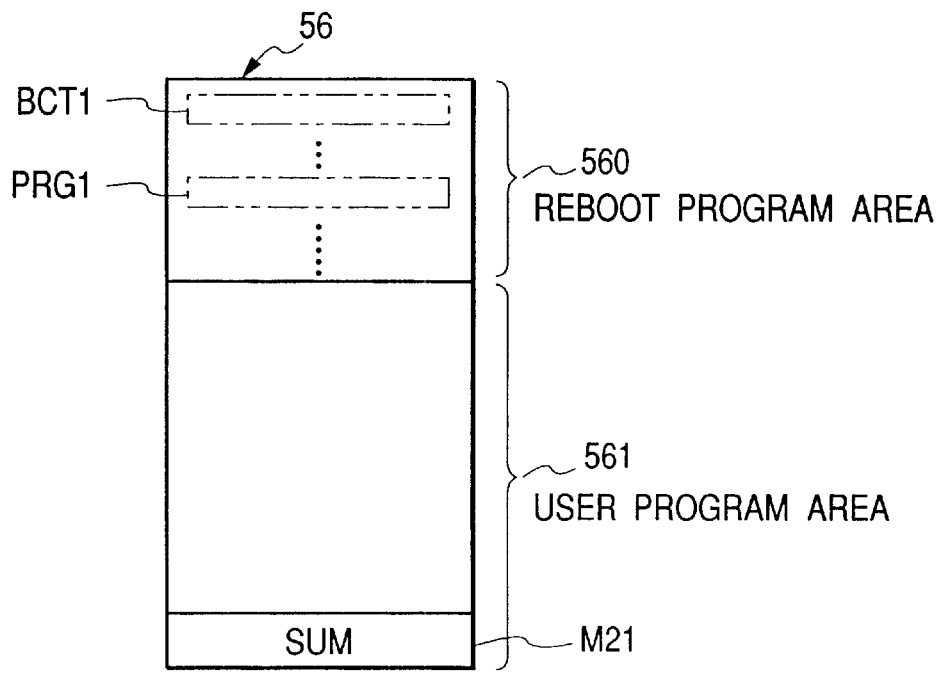
FIG. 23 is an explanatory view of the memory area of the flash memory to which a sum storing area is assigned.

Unlike the user program area 561 shown in FIG. 2, the user program area 561 shown in FIG. 23 has a memory area defined as a sum storing area M21 which stores the sum of the information held in the other memory area. Writing of a sum to the sum storing area M21 is performed each time writing to the user program area 561 is performed. Similarly to the reboot program area 560 described previously with reference to FIG. 2, the reboot program area 560 has an area which stores the reset vector BCT1, the reset processing program PRG1 and the like.

Figure 24:
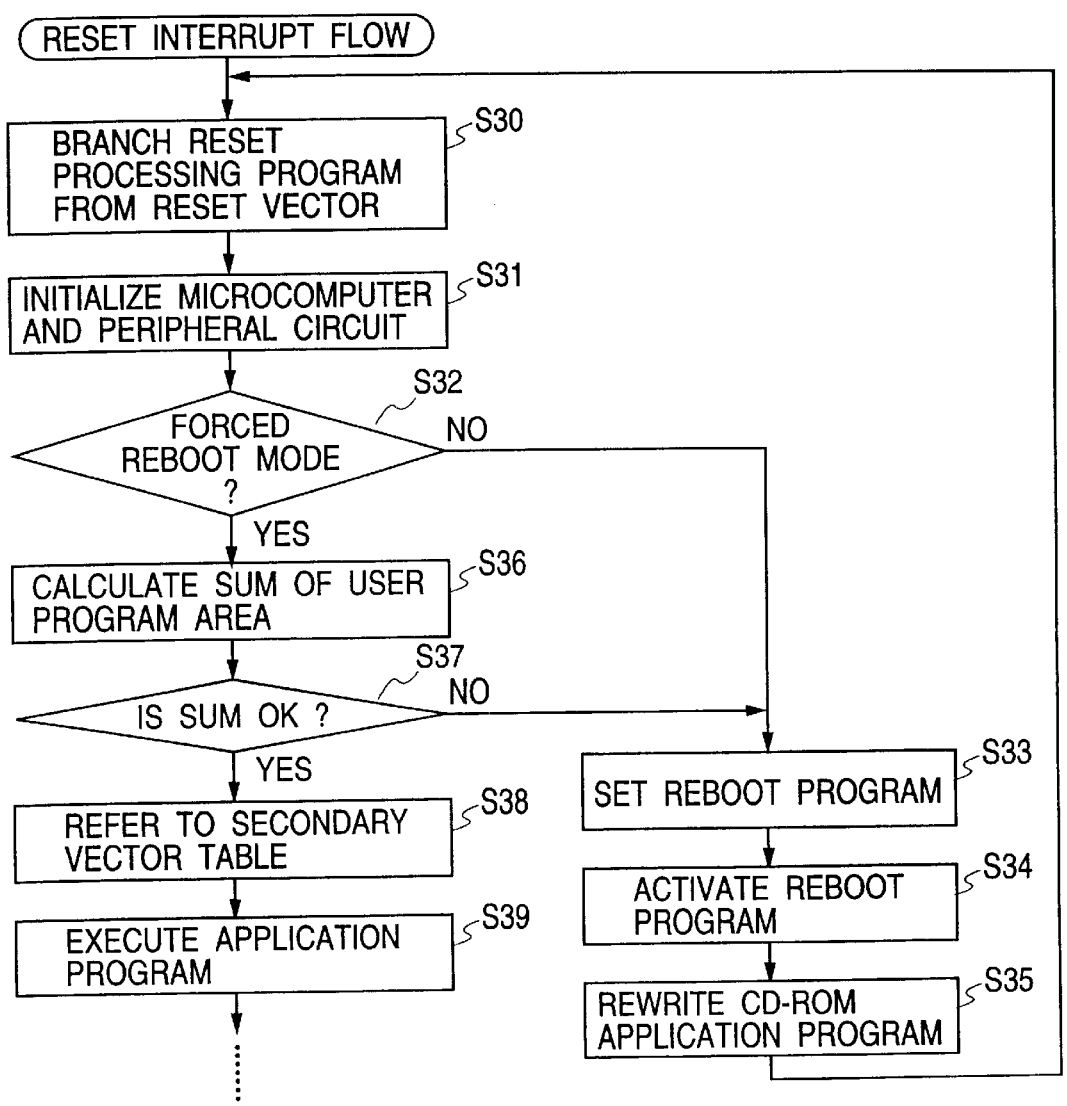
FIG. 24 is a flowchart of the operation of making a user program area rewritable on the basis of a sum at the time of reset.

FIG. 24 shows a flowchart of the operation of making the user program area 561 rewritable on the basis of the sum at the time of reset.

If a reset interrupt occurs, the CPU 51 responds to a reset instruction and proceeds to execution of the reset processing program PRG1 by referring to the reset vector BCT1 (S30), and initializes the microcomputer 5 and its peripheral circuits (S31).

Then, the CPU 51 determines whether the forced reboot mode capable of responding to a rewrite command has been selected (S32). If the disk ejecting switch has been pressed, it is determined that the forced reboot mode has been selected. If the forced reboot mode has been selected, the CPU 51 proceeds to execution of the reboot program after receiving the rewrite command, as described previously with reference to FIGS. 2 and 3. Specifically, the CPU 51 sets a reboot flag (S33), activates the reboot program after receiving the input of the rewrite command (S34), and writes a new application program into the user program area 561 as described previously (S35). At the end of this processing, the CPU 51 computes the sum of the data stored in the user program area 561 and stores the sum in the sum storing area M21.

If it is not determined in Step S32 that the forced reboot mode has been selected, the CPU 51 computes a sum as to the user program area 561 (S36) and determines whether the computed value coincides with the sum stored in the sum storing area M21 (S37).

If it is determined in Step S37 that the computed value does not coincide with the sum, the CPU 51 proceeds to execution of the reboot program after receiving the input of the rewrite command. If it is determined in Step S37 that the computed value coincides with the sum, the CPU 51 refers to the secondary vector table (S38) and proceeds to the state of being able to execute a program stored in the user program area 561 (S39).

In this manner, if the program in the user program area 561 is accidentally rewritten by an abnormality of the host 3, the CD-ROM drive 2 or the like, the operation of the CPU 51 can be made to self-diagnostically proceed to the state of being able to rewrite the user program area 561, merely by being reset, even if the forced reboot mode is not specified. Accordingly, it is possible to prevent the malfunction of the CD-ROM drive 2.

<<Another Example of Configuration of Programs>>

Figure 25:
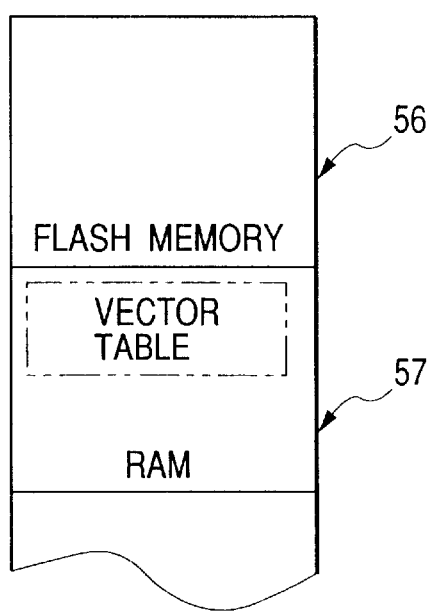
FIG. 25 is an explanatory view showing the state in which a vector table is disposed in a work RAM of the microcomputer.

In the above description, the application program is disposed in the user program area 561 of the flash memory 56, and the reboot program is disposed in the reboot program area 560. However, the configuration of the programs in the CD-ROM drive 2 can be changed as follows. AS shown in FIG. 25 by way of example, a vector table may be disposed in the work RAM 57. If the vector table is incorporated in a RAM, it becomes easy to dynamically change the contents of the vector table according to each operational mode of the CPU 51.

Figure 26:
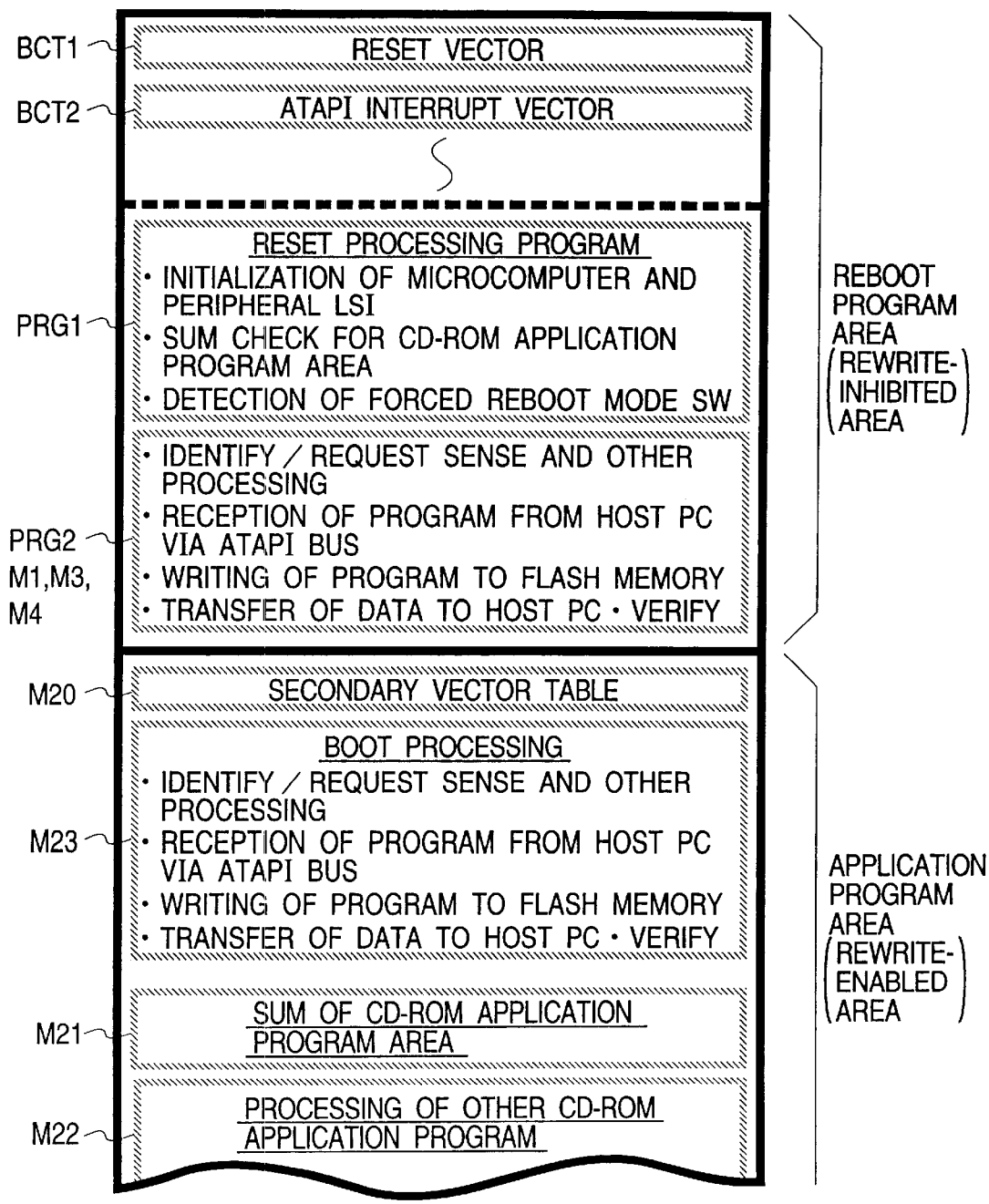
FIG. 26 explanatory view showing another example of the address map of the flash memory.

FIG. 26 shows another example of the address map of the flash memory 56. In the example shown in FIG. 26, the reset processing program PRG1 prescribes for a sum check, the processing of detecting the manipulation of a forced reboot mode SW (the disk ejecting switch), and the like. A boot processing program M23 contained in the user program area 561 prescribes for the same processing as each of the programs PRG2, M1, M3 AND M4 stored in the reboot program area 560. Specifically, even if the CPU 51 is the state of being able to execute the application program of the user program area 561, the CPU 51 can accept a rewrite command and rewrite the user program area 561. In this case, neither the manipulation of the disk ejecting switch nor a sum check is needed.

<<Manner of Writing to Flash Memory>>

A writing operation for the reboot program area 560 and the user program area 561 of the above-described flash memory 56 will be described below in association with the processing performed by a CD-ROM drive maker (drive maker) and that performed by a PC maker (personal-computer maker).

Figure 27:
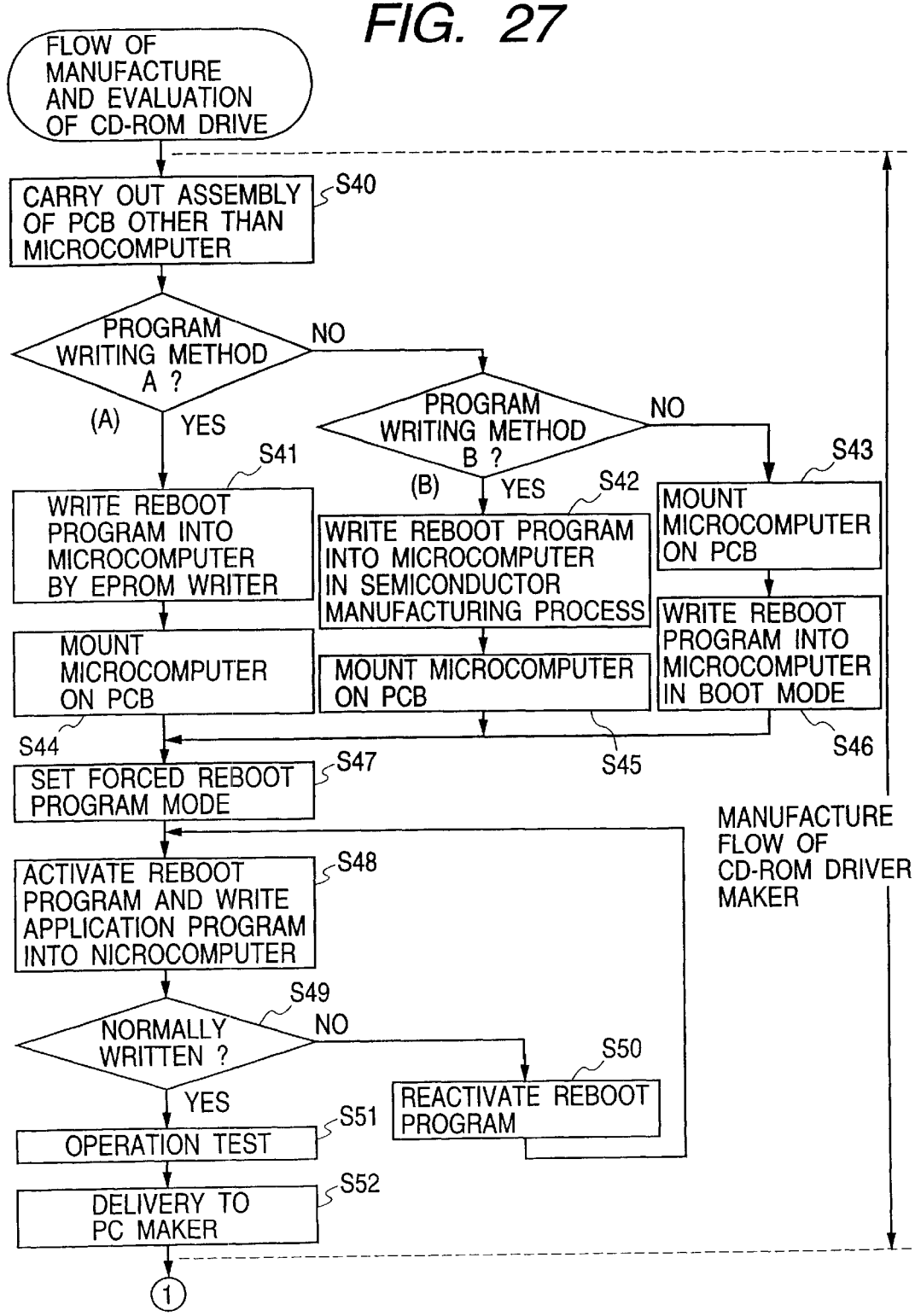
FIG. 27 is a flowchart showing one example of the sequence of manufacture of the CD-ROM drive by a CD-ROM drive maker.

FIG. 27 is a flowchart showing the sequence of manufacture of the CD-ROM drive 2 by a CD-ROM drive maker.

The CD-ROM drive maker purchases the microcomputer 5 from an LSI maker, and assembles the CD-ROM drive 2. Its circuit portion is arranged on a printed circuit board (PCB) (S40). At this time, a program is written into the reboot program area 560 of the flash memory 56 built in the microcomputer 5 in any one of the following manners: the manner in which the CD-ROM drive maker performs writing with an EPROM writer (S41); the manner in which a semiconductor maker performs writing in the process of manufacturing the microcomputer 5 (S42); and the manner in which after the microcomputer 5 is mounted on the printed circuit board (S43), the microcomputer 5 is set to a boot mode and writing is performed (S46).

Figure 31:
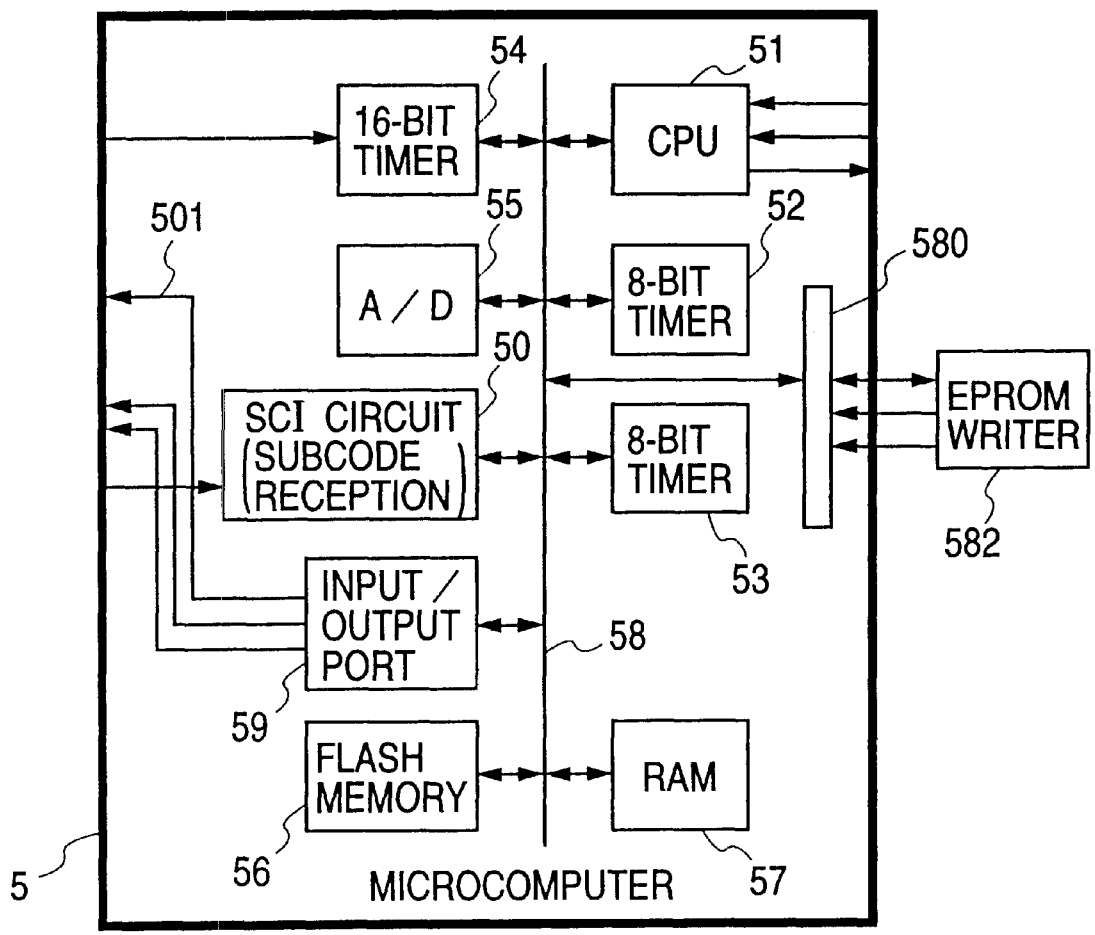
FIG. 31 is a block diagram of a microcomputer, showing the state in which a processing program for the microcomputer is being written by using an EPROM writer.

If writing is to be performed with the EPROM writer, a port 581 (not shown in FIG. 1) which interfaces the internal bus 58 of the microcomputer 5 with the outside is connected to an EPROM writer 582, as shown in FIG. 31 by way of example. The EPROM writer 582 applies writing high voltage to the microcomputer 5, and sets the microcomputer 5 to a program mode. Since the microcomputer 5 which has been set to the program mode is regarded as matter similar to a flash memory LSI by the EPROM writer 582, the EPROM writer 582 becomes able to rewrite the built-in flash memory 56 of the microcomputer 5 from the outside. In this state, the reboot program or the like is initially written into the reboot program area 560 of the flash memory 56 by the EPROM writer 582 (S41). After the reboot program has been written into the reboot program area 560 of the microcomputer 5, the microcomputer 5 is mounted on the printed circuit board of the CD-ROM drive 2 (S44). Incidentally, in FIG. 31, identical reference numerals are used to denote circuit blocks identical to those shown in FIG. 1.

If writing to the reboot program area 560 of the microcomputer 5 has already been completed by the LSI maker (S42), the microcomputer 5 is mounted on the printed circuit board of the CD-ROM drive 2 (S45).

Figure 30:
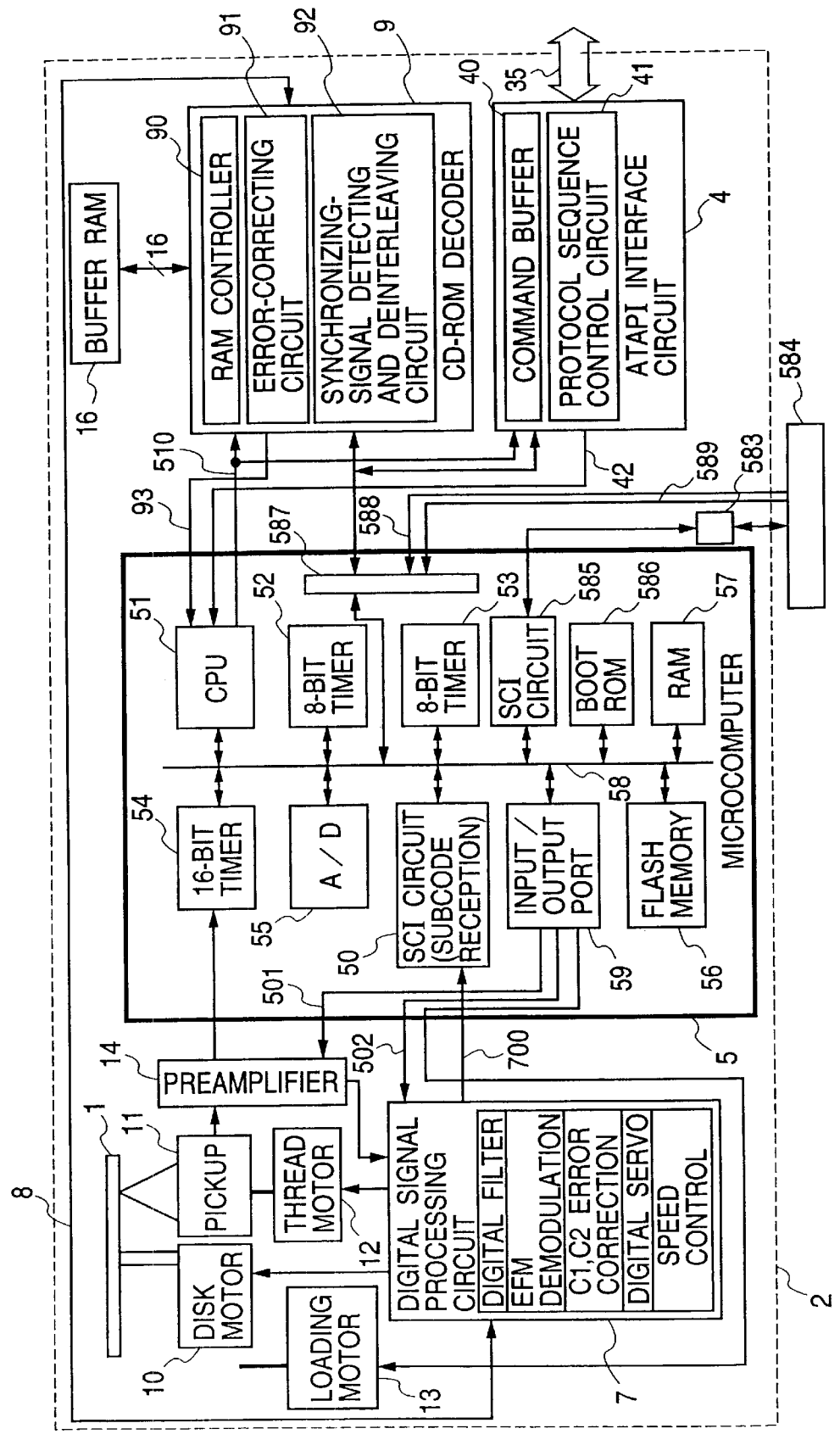
FIG. 30 is a block diagram of a CD-ROM drive having a serial port, showing the state in which a processing program is being written into a microcomputer via the serial port.

After the microcomputer 5 has been mounted on the printed circuit board, if it is desired to set the microcomputer 5 to the boot mode and write the program into the reboot program area 560 (S46), control is performed by a host 584 connected to the microcomputer 5 via a serial port 583 such as RS23C, as shown in FIG. 30 by way of example. The microcomputer 5 shown in FIG. 30 has a construction in which a SCI circuit 585, a boot ROM 586 and a port 587 are added to the microcomputer 5 shown in FIG. 1. When writing high voltage 588 and a boot mode signal 589 are supplied from the SCI circuit 585 to the microcomputer 5 via the port 587, the CPU 51 executes the boot program of the boot ROM 586. By executing the boot program, the CPU 51 totally erases the flash memory 56 and initializes the SCI circuit 585 so that the microcomputer 5 can interface with the host 584 via the serial port 583. The CPU 51 performs control to write programs supplied from the host 584 into the reboot program area 560 of the flash memory 56. Thus, programs such as a reboot program of the type described previously with reference to FIG. 2 are written into the reboot program area 560 of the flash memory 56. Incidentally, the speed of the writing operation using the serial port 583 is generally slow because of its nature. In this case, the serial port 583 which is not directly used for a disk accessing operation must be especially disposed on the circuit board of the CD-ROM drive 2, so that attention must be paid to the fact that the physical scale of the circuit board of the CD-ROM drive 2 becomes larger. If priority is given to a reduction in the physical scale of the CD-ROM drive 2, it is preferable not to dispose an arrangement for writing a program via the serial port 583.

After the reboot program area 560 of the flash memory 56 has been initialized in any one of the above-described steps S44, S45 and S46, the microcomputer 5 is reset, and the forced reboot program mode is set so that writing to the user program area 561 is performed (S47). Then, when a write command is issued from the host 3, the reboot program is activated and the application program such as an application program is written into the user program area 561 (S48). It is determined whether the application program has been normally written (S49), and if an abnormality is detected, the reboot program is again activated (S50). If the application program has been normally written, the microcomputer 5 is made to execute the written application program to perform an operation test on the CD-ROM drive 2 (S51). If no abnormality is found in the CD-ROM drive 2 in the operation test, the CD-ROM drive 2 is delivered to the PC maker (S52).

Figure 29:
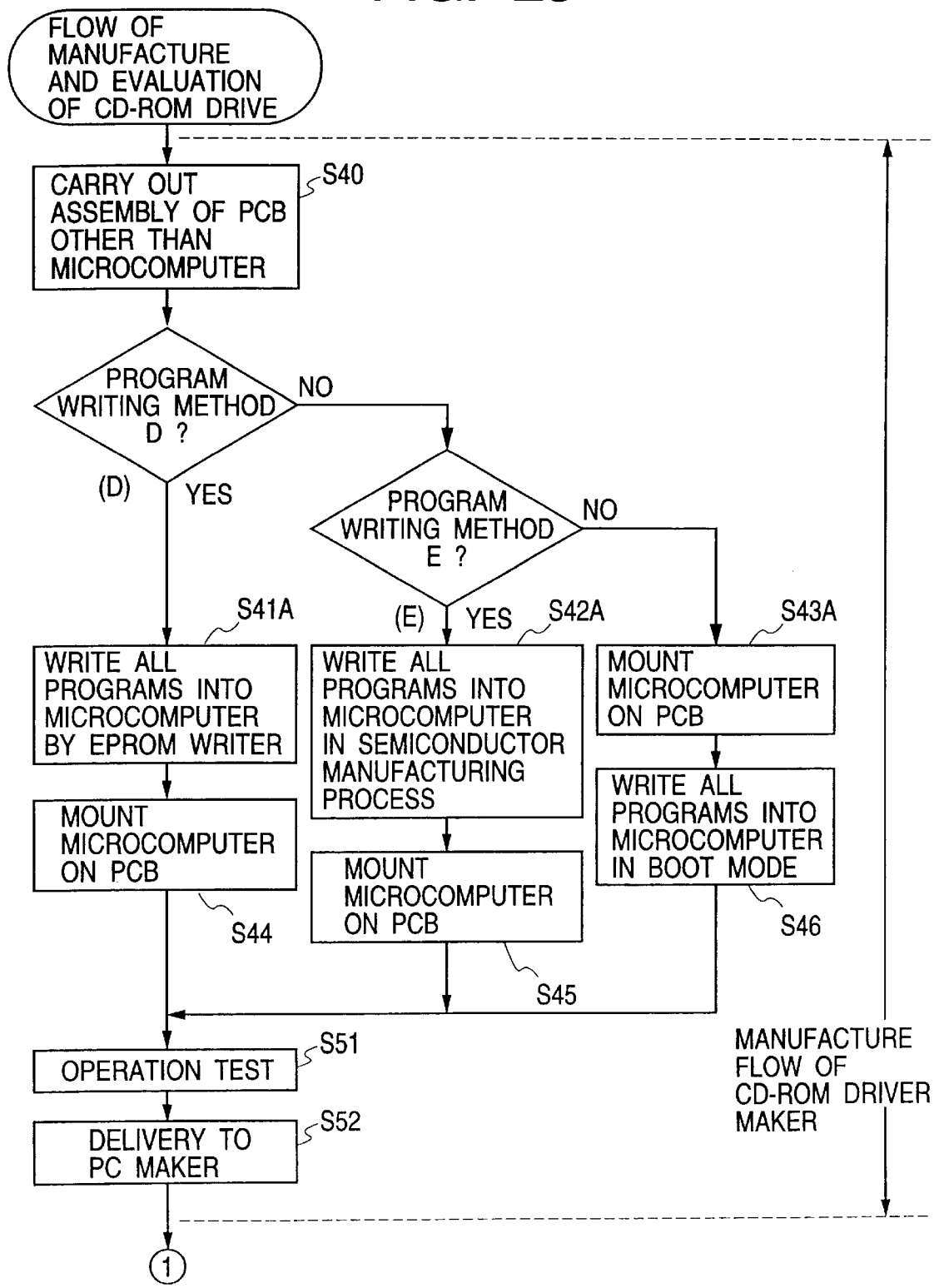
FIG. 29 flowchart similar to FIG. 27, but showing one example of the operation of writing processing programs into a reboot program area and a user program area together.

It is to be noted that writing to the reboot program area 560 of the flash memory 56 and writing to the user program area 561 of the same may be performed not separately but all together, as shown in FIG. 29 by way of example. Specifically, in Step S41A shown in FIG. 29, all the programs are written into the reboot program area 560 and the user program area 561 of the flash memory 56 by using the EPROM writer. In Step S42A, the LSI maker which manufactures the microcomputer 5 writes all the programs. In Step S43A, the CD-ROM drive maker writes all the programs by using the boot mode of the microcomputer 5.

Figure 28:
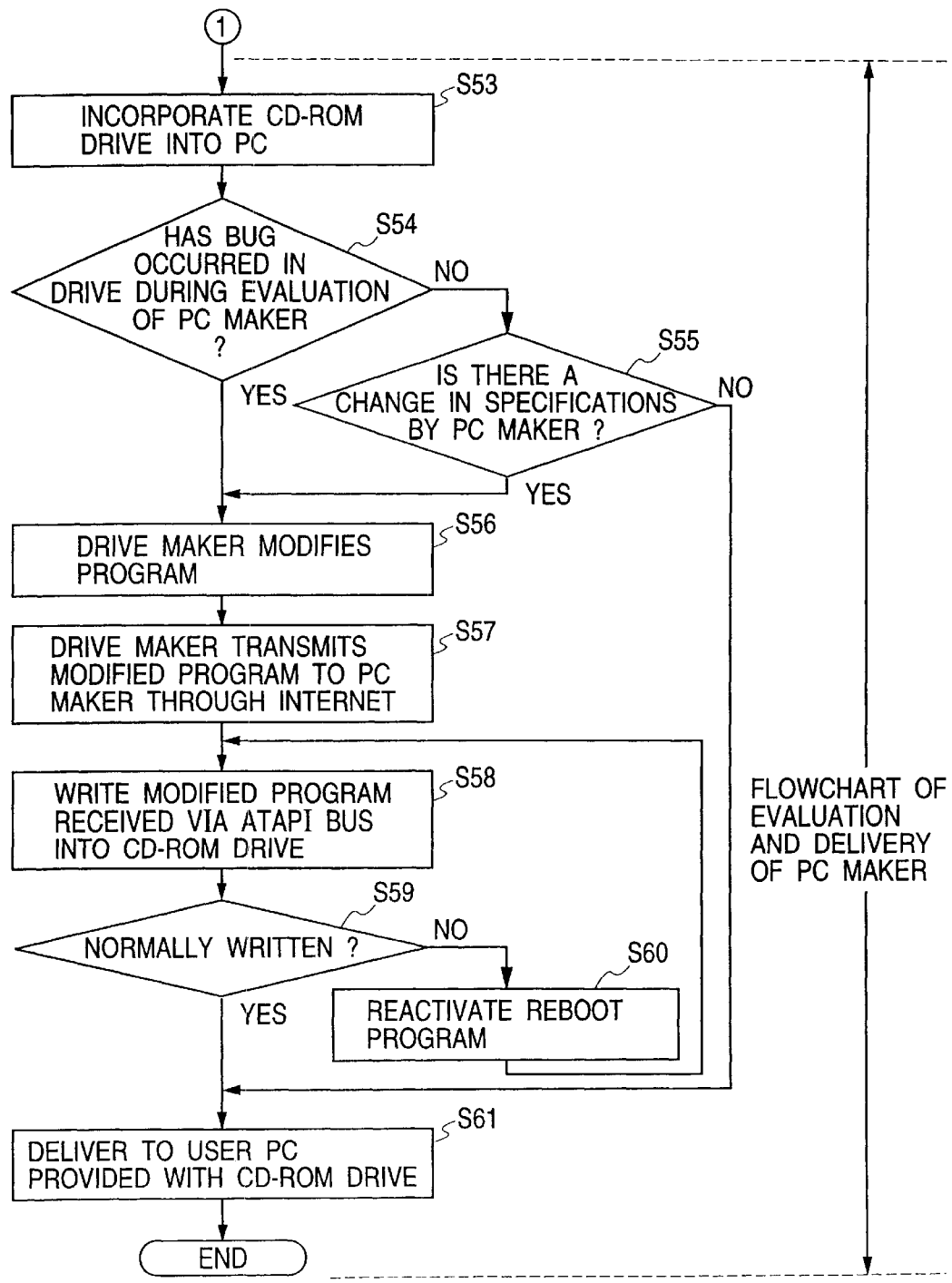
FIG. 28 is a flowchart showing one example of the sequence of evaluation of a personal computer by a PC maker using the CD-ROM drive delivered by the CD-ROM drive maker.

FIG. 28 is a flowchart showing one example of the sequence of evaluation of the personal computer by the PC maker using the CD-ROM drive 2 delivered by the CD-ROM drive maker.

The PC maker incorporates the CD-ROM drive 2 delivered by the CD-ROM drive maker into the corresponding personal computer 30 (S53). At this time, the CD-ROM drive 2 is connected to the IDE interface controller 34 of the PC board 37 via the ATAPI interface circuit 4. In this state, the PC maker accesses the CD-ROM drive 2 and performs evaluation on the CD-ROM drive 2, while causing the microprocessor 31 of the personal computer 30 to execute a required test program, an arbitrary application program. During this evaluation, the PC maker checks whether a bug is contained in the application program of the CD-ROM drive 2 (S54), and also checks whether the application program includes a portion having specifications to be changed by the PC maker (S55). If there is no bug and the specifications need not be changed, personal computers of the same type are evaluated as products which can be combined with the CD-ROM drive 2 without any problem. The PC maker incorporates the CD-ROM drive 2 into a personal computer of this type and delivers the personal computer to an end user (S61).

On the other hand, if a bug is detected in Step S54 and a specification to be changed is detected in. Step S55, information about the bug and the specification to be changed is transmitted to the CD-ROM drive maker. At this time, the PC maker does not need to remove the CD-ROM drive 2 itself from the personal computer 30 and send back the CD-ROM drive 2 to the CD-ROM drive maker.

The CD-ROM drive maker corrects the application program in accordance with the information (S56). The corrected application program is transmitted to the PC maker, for example, via the Internet or the like (S57). The transmitted corrected application program can be received by the personal computer which is used in actual evaluation. Then, the received corrected application program is written into the flash memory 56 of the CD-ROM drive 2 (S58). As described previously in detail, by setting the microcomputer 5 to the forced reboot mode, it is possible to immediately perform the writing operation in the personal computer 30 itself. It is determined whether the corrected application program has been normally written (S59), and if an abnormality is detected, the reboot program is again activated (S60). If the corrected application program has been normally written, the evaluation of this type of personal computer is completed. In this manner, even if the application program has a bug or the PC maker is to change the specifications of the application program, the corrected application program can be easily reinstalled in the CD-ROM drive 2, whereby the CD-ROM drive 2 can be evaluated in a short time period in the state of being incorporated in the personal computer 30.

Before the delivery of the personal computer, if required, the PC maker may reinstall the corrected application program in the CD-ROM drive 2 or the PC maker itself may write the PC maker's unique information (ID (identification) information of the CD-ROM drive 2) into the flash memory 56. Thus, the personal computer is delivered to an end user (S61).

Although the present invention made by the present inventor has been specifically described hereinabove with reference to the embodiment, the prevent invention is not limited to only the embodiment, and it is needless to say that various modifications can be made without departing from the scope and spirit of the present invention.

For example, the manner of setting of the reboot mode is not limited to the above-described example, and the reboot mode can also be set with only a vendor unique command. In this case, by using the decoding result of the vendor unique command, it is possible to transfer the processing of a CPU to a user reboot program. If an application program is to be written into a nonvolatile memory for the first time on a mass production line for a stored information reproducing apparatus, control may be transferred to the user reboot mode by detecting through software a state in which nothing is stored (for example, all bits have logic 0s or 1s) in a secondary vector table placed at the leading end of the application program. In addition, a predetermined block of a flash memory may be constructed of two banks so that either bank can be used as a rewrite-inhibited area. Switchover between the banks is linked to the setting of the user reboot mode, and a block on a write-inhibited side is used during the user reboot mode. The above-described sum may also be obtained not only by simply summing the data of the user program area but also by summing the data through appropriate logic.

Incidentally, the reboot program means an initial program for writing or rewriting the application program. Accordingly, it may also be understood that the initial program is stored in the reboot program area.

Industrial Applicability

As is apparent from the foregoing description, the disk drive according to the present invention can be widely applied to not only CD-ROM drives but also other recorded information producing apparatus or information recording/reproducing apparatus. Such disk drive can be mounted in not only personal computers but also a wide variety of computers such as workstations and office computers irrespective of their names.

What is claimed is:

1. A disk drive for reading information from a disk and outputting the read information which is to be provided to a host, comprising:

an accessing circuit which accesses the disk and generates the read information from the disk;

an interface circuit which transfers the generated read information from the accessing circuit to the host; and a microcomputer, coupled with the accessing circuit and with the interface circuit, including a central processing unit and an electrically erasable and programmable nonvolatile memory, wherein the electrically erasable and programmable nonvolatile memory stores a first program, a second program and a third program, wherein using the stored first program, the microcomputer controls the accessing circuit so that the operation of the accessing circuit is controlled by the stored first program, wherein using the stored second program, the central processing unit is adapted to detect whether or not a specific command is provided to the interface circuit from the host, the specific command enables a rewrite operation of the contents of the first program in the electrically erasable and programmable nonvolatile memory by the microcomputer, and wherein using the stored third program, in response to the specific command detected by the central processing unit, the microcomputer is adapted to transfer data for rewriting the contents of the first program in the electrically erasable and programmable nonvolatile memory from the host to the electrically erasable and programmable nonvolatile memory via the interface circuit.

2. A disk drive according to claim 1, further comprising a buffer memory, wherein the data for rewriting the contents of the first program is transferred to the buffer memory from the host via the interface circuit, and wherein the data stored in the buffer memory is transferred to the electrically erasable and programmable nonvolatile memory.

3. A disk drive according to claim 2, wherein the electrically erasable and programmable nonvolatile memory is a flash memory.

4. A disk drive according to claim 3, wherein the flash memory includes a rewrite-inhibited area and a rewrite-enabled area, wherein the first program is stored in the rewrite-enabled area, and wherein the second program and the third program are stored in the rewrite-inhibited area.

5. A disk drive according to claim 4, wherein the flash memory further stores a fourth program, and wherein using the stored fourth program, the microcomputer rewrites the contents of the first program in the flash memory in accordance with updating data transferred from the host to the buffer memory by the microcomputer.

6. A disk drive according to claim 5, wherein the fourth program for rewriting to the flash memory is stored in the rewrite-inhibited area.

7. A disk drive according to claim 6, wherein the disk is an optical disk.

8. A disk drive according to claim 2, wherein the electrically erasable and programmable nonvolatile memory further stores a fourth program, and wherein using the stored fourth program, the microcomputer rewrites the contents of the first program in the electrically erasable and programmable nonvolatile memory in accordance with updating data transferred from the host to the buffer memory by the microcomputer.

9. A disk drive according to claim 8, wherein the fourth program for rewriting to the electrically erasable and programmable nonvolatile memory is stored in the rewrite-inhibited area.

10. A disk drive according to claim 9, wherein the disk is an optical disk.

11. A disk drive according to claim 1, wherein the electrically erasable and programmable nonvolatile memory and the central processing unit are formed on a semiconductor substrate of the microcomputer.

12. A disk drive for reading information from a disk and outputting the read information which is to be provided to a host, comprising:

an accessing circuit which accesses the disk and generates the read information from the disk;

an ATA packet interface circuit which transfers the generated read information from the accessing circuit to the host; and a microcomputer, coupled with the accessing circuit and with the ATA packet interface circuit, including a central processing unit and an electrically erasable and programmable nonvolatile memory, wherein the electrically erasable and programmable nonvolatile memory stores a first program, a second program and a third program, wherein using the stored first program, the microcomputer controls the accessing circuit so that the operation of the accessing circuit is controlled by the stored first program, wherein using the stored second program, the central processing unit is adapted to detect whether or not a specific command is provided to the ATA packet interface circuit from the host, the specific command enables a rewrite operation of the contents of the first program in the electrically erasable and programmable nonvolatile memory by the microcomputer, and wherein using the stored third program, in response to the specific command detected by the central processing unit, the microcomuter is adapted to transfer data for rewriting the contents of the first program in the electrically erasable and programmable nonvolatile memory via the ATA packet interface circuit.

13. A disk drive according to claim 12, wherein the ATA packet interface circuit includes a command buffer for storing commands.

14. A disk drive according to claim 14, wherein the electrically erasable and programmable nonvolatile memory and the central processing unit are formed on a semiconductor susbtrate of the microcomputer.

15. A disk drive according to claim 13, further comprising a buffer memory, wherein the data for rewriting the contents of the first program is transferred to the buffer memory from the host via the ATA packet interface circuit, and wherein the data stored in the buffer memory is transferred to the electrically erasable and programmable nonvolatile memory.

16. A disk drive according to claim 15, wherein the electrically erasable and programmable nonvolatile memory is a flash memory.

17. A disk drive according the claim 16, wherein the flash memory includes a rewrite-inhibited area and a rewrite-enabled area, wherein the first program is stored in the rewrite-enabled area, and wherein the second program and third program are stored in the rewrite-inhibited area.

18. A disk drive according to claim 17, wherein the flash memory further stores a fourth program, and wherein using the stored fourth program, the microcomputer rewrites the contents of the first program in the flash memory in accordance with updating data transferred from the host to the buffer memory by the microcomputer.

19. A disk drive according to claim 18, wherein the fourth program for rewriting to the flash memory is stored in the rewrite-inhibited area.

20. A disk drive according to claim 19, wherein the disk is an optical disk.

21. A disk drive according to claim 15, wherein the electrically erasable and programmable nonvolatile memory further stores a fourth program, and wherein using the stored fourth program, the microcomputer rewrites the contents of the first program in the electrically erasable and programmable nonvolatile memory in accordance with updating data transferred from the host to the buffer memory by the microcomputer.

22. A disk drive according to claim 21, wherein the fourth program for rewriting to the electrically erasable and programmable nonvolatile memory is stored in the rewrite-inhibited area.

23. A disk drive according to claim 22, wherein the disk is an optical disk.

* * * * *